United States Patent
Jeong

(10) Patent No.: US 8,023,576 B2
(45) Date of Patent: Sep. 20, 2011

(54) APPARATUS AND METHOD TO ESTIMATE SAMPLING OFFSET

(75) Inventor: Jun-young Jeong, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 958 days.

(21) Appl. No.: 11/942,162

(22) Filed: Nov. 19, 2007

(65) Prior Publication Data

US 2008/0225961 A1 Sep. 18, 2008

(30) Foreign Application Priority Data

Mar. 12, 2007 (KR) .................. 10-2007-0024196

(51) Int. Cl.
*H04K 1/10* (2006.01)

(52) U.S. Cl. ........ 375/260; 375/259; 375/329; 375/341; 375/342; 375/344; 375/331; 370/208; 370/281; 370/295

(58) Field of Classification Search .......... 375/260, 375/259, 329, 341, 342, 344, 331; 370/208, 370/281, 295
See application file for complete search history.

(56) References Cited

U.S. PATENT DOCUMENTS

| 2004/0001563 A1* | 1/2004 | Scarpa ...................... 375/326 |
| 2005/0094739 A1 | 5/2005 | Takesue et al. |
| 2006/0018393 A1 | 1/2006 | Gore et al. |
| 2007/0002981 A1* | 1/2007 | Gaikwad et al. ........... 375/346 |
| 2007/0019763 A1* | 1/2007 | Kim et al. .................. 375/346 |

FOREIGN PATENT DOCUMENTS

KR 2006-85758 7/2006

* cited by examiner

*Primary Examiner* — Dac V Ha
*Assistant Examiner* — Zewdu Kassa
(74) *Attorney, Agent, or Firm* — Stanzione & Kim, LLP

(57) ABSTRACT

A sampling offset estimation apparatus including a pilot sub-carrier refiner, an information sub-carrier refiner, a data sub-carrier refiner, and a sampling offset estimator. The pilot sub-carrier refiner to refine a pilot sub-carrier extracted from a differential demodulated signal, and to generate a reference pilot sub-carrier. The information sub-carrier refiner to refine an information sub-carrier extracted from the differential demodulated signal, and to generate a reference information sub-carrier. The data sub-carrier refiner to refine a data sub-carrier extracted from the differential demodulated signal, and to generate a reference data sub-carrier. The sampling offset estimator to estimate a sampling offset included in the differential demodulated signal, on a basis of the reference pilot sub-carrier, the reference information sub-carrier, and the reference data sub-carrier.

35 Claims, 16 Drawing Sheets

FIG. 9
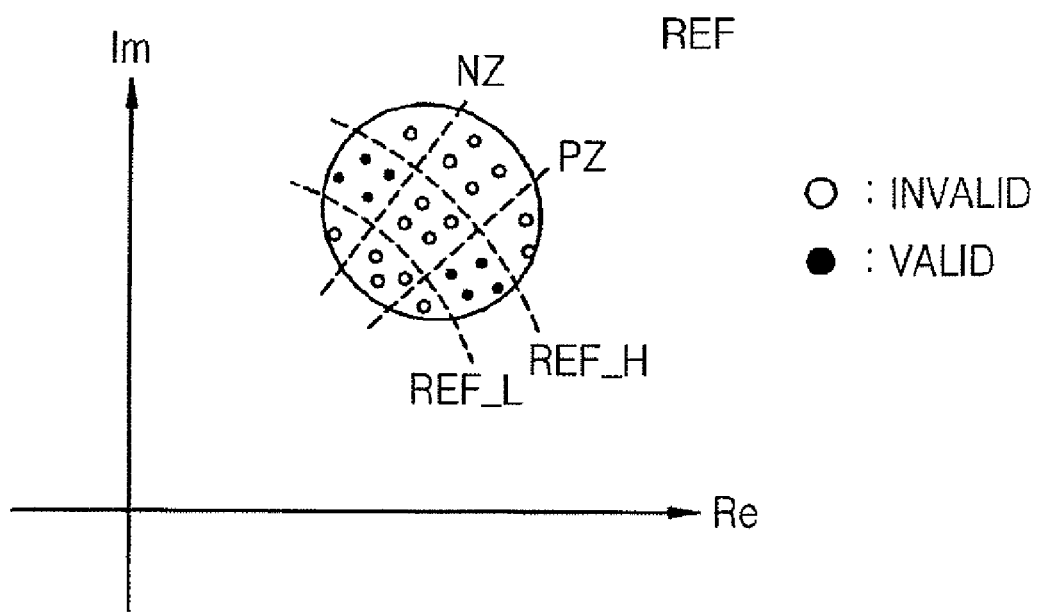
○ : INVALID
● : VALID
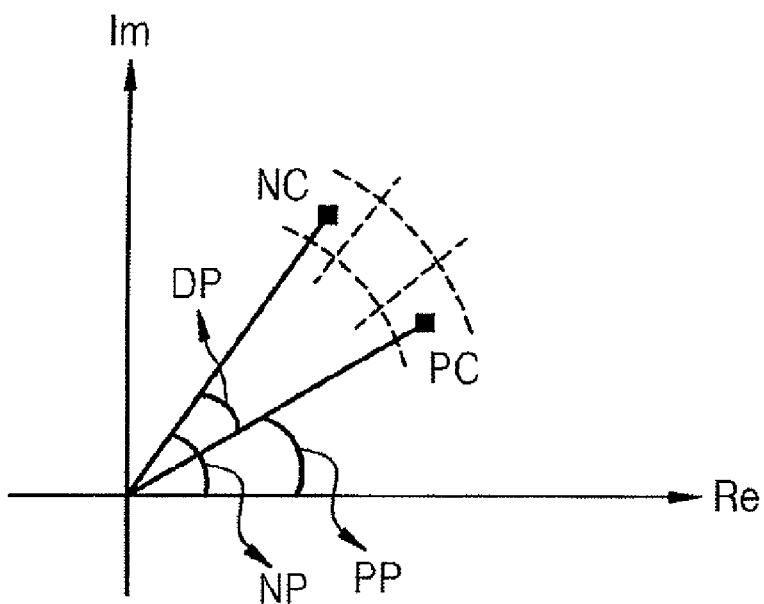

APPARATUS AND METHOD TO ESTIMATE SAMPLING OFFSET

CROSS-REFERENCE TO RELATED APPLICATIONS

This application claims priority under 35 U.S.C. §119(a) from Korean Patent Application No. 10-2007-0024196, filed on Mar. 12, 2007, in the Korean Intellectual Property Office, the disclosure of which is incorporated herein in its entirety by reference.

BACKGROUND OF THE INVENTION

1. Field of the Invention

The present general inventive concept relates to an apparatus and method to estimate a sampling offset, and more particularly, to an apparatus and method to estimate a sampling offset included in a differential demodulated signal, using a pilot sub-carrier, an information sub-carrier, and a data sub-carrier extracted from the differential demodulated signal.

2. Description of the Related Art

Recently, a variety of broadcast/communication systems have used an Orthogonal Frequency Division Multiplexing (OFDM) communication method. The OFDM communication method transmits data using a plurality of orthogonal sub-carriers. Meanwhile, a Differential Quadrature Phase Shift Keying (DQPSK) Modulation method is a differential modulation method for shifting 2 bits of data and transmitting four waves having different phases. An Integrated Service Digital Broadcasting-Terrestrial (ISDB-T) method, an Integrated Service Digital Broadcasting-Terrestrial Sound Broadcasting (ISDB-TSB) method, etc. are used in OFDM/DQPSK systems that adopt the OFDM communication method and the DQPSK modulation method.

FIG. 1 is a view illustrating a frame structure which is used in an OFDM/DQPSK system.

Referring to FIG. 1, a frame 1 FRAME includes a plurality of symbols. In view of a time domain, each symbol period is divided into a guide interval GI and a valid symbol interval VI. In view of a frequency domain, each symbol includes a plurality of sub-carriers. The plurality of sub-carriers include data sub-carriers for transmitting data, information sub-carriers for transmitting control information such as a code rate, etc., and pilot sub-carriers which are used for channel estimation, offset estimation, etc. As illustrated in FIG. 1, in the OFDM/DQPSK system, a number of pilot sub-carriers is very small and most sub-carriers are data sub-carriers.

FIG. 2 is a block diagram illustrating a part of a receiver which is used in an OFDM/DQPSK system.

Referring to FIG. 2, the receiver includes an analog-digital converter (ADC) 202 for converting an analog signal Rx received through an antenna (not illustrated) into a digital signal, a sampling offset compensator 204 for compensating for a sampling offset which is generated during analog-digital conversion, a Fast Fourier Transform (FFT) block 206 for performing a FFT, a delayer 207 for delaying symbols, a differential demodulator 208 for receiving a current symbol $S_I$ and the previous symbol $S_{I-1}$ and performing differential demodulation on the current symbol $S_I$ and the previous symbol $S_{I-1}$, and a sampling offset estimator 210 for estimating a sampling offset SO on a basis of sub-carriers Psc extracted from the differential-demodulated signal.

However, conventionally, since the sampling offset estimator 210 estimates the sampling offset SO on the basis of only a small number of pilot sub-carriers Psc, it is difficult to accurately estimate the sampling offset SO. In particular, existence of a fading channel results in the accuracy of estimation being further lowered.

FIG. 3 is a view illustrating a response characteristic of a fading channel. In FIG. 3, a horizontal axis represents carrier indexes and a vertical axis represents response magnitudes according to carrier indexes.

Existence of an ideal channel results in a response magnitude of the ideal channel will be constant regardless of carrier indexes. However, in an actual channel, a fading characteristic as illustrated in FIG. 3 appears. As illustrated in FIG. 3, a response magnitude corresponding to a pilot sub-carrier Psc belonging to a fading region is very small due to influence of fading. The problem which occurs when the sampling offset SO is estimated on the basis of only a small number of pilot sub-carriers Psc becomes more significant if the pilot sub-carriers Psc belong to a fading region. That is, the sampling offset SO which is estimated on the basis of the pilot sub-carriers Psc belonging to the fading region will be further inaccurate.

SUMMARY OF THE INVENTION

The present general inventive concept provides a sampling offset estimation apparatus and method which can accurately estimate a sampling offset using all of pilot sub-carriers, information sub-carriers, and data sub-carriers.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a sampling offset estimation apparatus including a pilot sub-carrier refining unit to refine a pilot sub-carrier extracted from a differential demodulated signal, and o generate a reference pilot sub-carrier, an information sub-carrier refining unit to refine an information sub-carrier extracted from the differential demodulated signal, and to generate a reference information sub-carrier, a data sub-carrier refining unit to refine a data sub-carrier extracted from the differential demodulated signal, and to generate a reference data sub-carrier, a sampling offset estimating unit to estimate a sampling offset included in the differential demodulated signal, on a basis of the reference pilot sub-carrier, the reference information sub-carrier, and the reference data sub-carrier.

The reference pilot sub-carrier, the reference information sub-carrier, and the reference data sub-carrier may have phases around a predetermined reference phase.

The foregoing and/or other aspects and utilities of the general inventive concept may also be achieved by providing a sampling offset estimation method including refining a pilot sub-carrier extracted from a differential demodulated signal, and generating a reference pilot sub-carrier, refining an information sub-carrier extracted from the differential demodulated signal, and generating a reference information sub-carrier, refining a data sub-carrier extracted from the differential demodulated signal, and generating a reference data sub-carrier, adding a plurality of reference pilot sub-carriers having negative (−) carrier indexes, a plurality of reference information sub-carriers having negative (−) carrier indexes, and a plurality of reference data sub-carriers having negative (−) carrier indexes, detecting a phase of the result of the addition, and to output a first phase detection value, adding a plurality of reference pilot sub-carriers having positive (+) carrier indexes, a plurality of reference information sub-carriers having positive (+) carrier indexes, and a plurality of reference data sub-carriers having positive (+) carrier indexes, detecting a phase of the result of the addition, and to output a second phase detection value, to output a difference between the first phase detection value and the second phase detection value, as indicating information of the sampling offset.

The sampling offset estimation method may further include removing data sub-carriers with magnitudes not within a predetermined valid range, from a plurality of data sub-carriers extracted from the differential demodulated signal.

The sampling offset estimation method may further include removing reference pilot sub-carriers, reference information sub-carriers, and data sub-carriers, with carrier indexes k within a range of $-a \leq k \leq +a$, wherein, if a minimum carrier index of k is $-K$ and a maximum carrier index of k is $+K$, a is a natural number smaller than K.

The foregoing and/or other aspects and utilities of the general inventive concept may also be achieved by providing a sampling offset estimation apparatus, including a receiving unit to receive a differential demodulated signal and a sampling offset estimating unit to estimate a sampling offset included in the differential demodulated signal based on a reference pilot sub-carrier, a reference information sub-carrier and a reference data sub-carrier.

The foregoing and/or other aspects and utilities of the general inventive concept may also be achieved by providing a sampling offset estimation apparatus, including an identifying unit to identify one or more sub-carriers within a predetermined range, one or more sub-carrier refining units to generate reference sub-carriers based on the identified one or more sub-carriers and a sampling offset estimating unit to estimate a sampling offset based on the generated reference sub-carriers.

The foregoing and/or other aspects and utilities of the general inventive concept may also be achieved by providing a method of estimating a sampling offset of a communication apparatus, the method including receiving a differential demodulated signal and estimating a sampling offset included in the differential demodulated signal based on a reference pilot sub-carrier, a reference information sub-carrier and a reference data sub-carrier.

The foregoing and/or other aspects and utilities of the general inventive concept may also be achieved by providing a method of estimating a sampling offset of a communication apparatus, the method including identifying one or more sub-carriers within a predetermined range, generating reference sub-carriers based on the identified one or more sub-carriers and estimating a sampling offset based on the generated reference sub-carriers.

The foregoing and/or other aspects and utilities of the general inventive concept may also be achieved by providing a computer-readable recording medium having embodied thereon a computer program to execute a method, wherein the method includes receiving a differential demodulated signal and estimating a sampling offset included in the differential demodulated signal based on a reference pilot sub-carrier, a reference information sub-carrier and a reference data sub-carrier.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIGS. 9 and 10 illustrate a method to estimate a sampling offset from reference sub-carriers, according to an embodiment of the present general inventive concept.

DETAILED DESCRIPTION OF THE PREFERRED EMBODIMENTS

Figure 1:
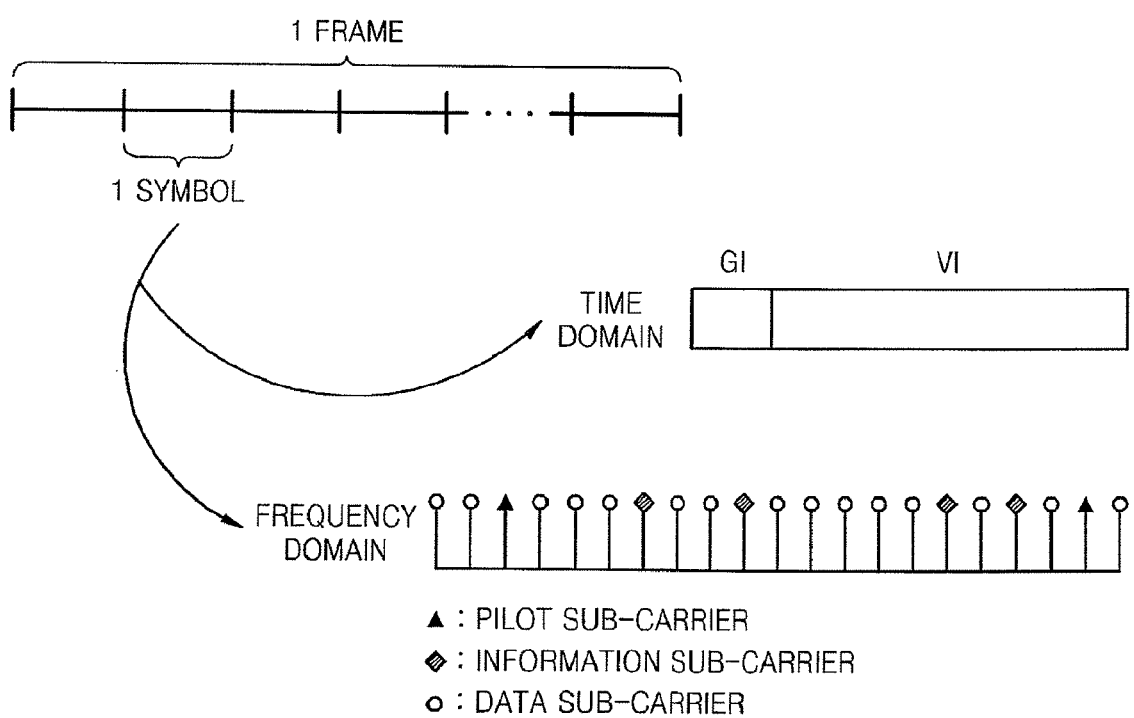
FIG. 1 is a view illustrating a frame structure which is used in an OFDM/DQPSK system.
Figure 2:
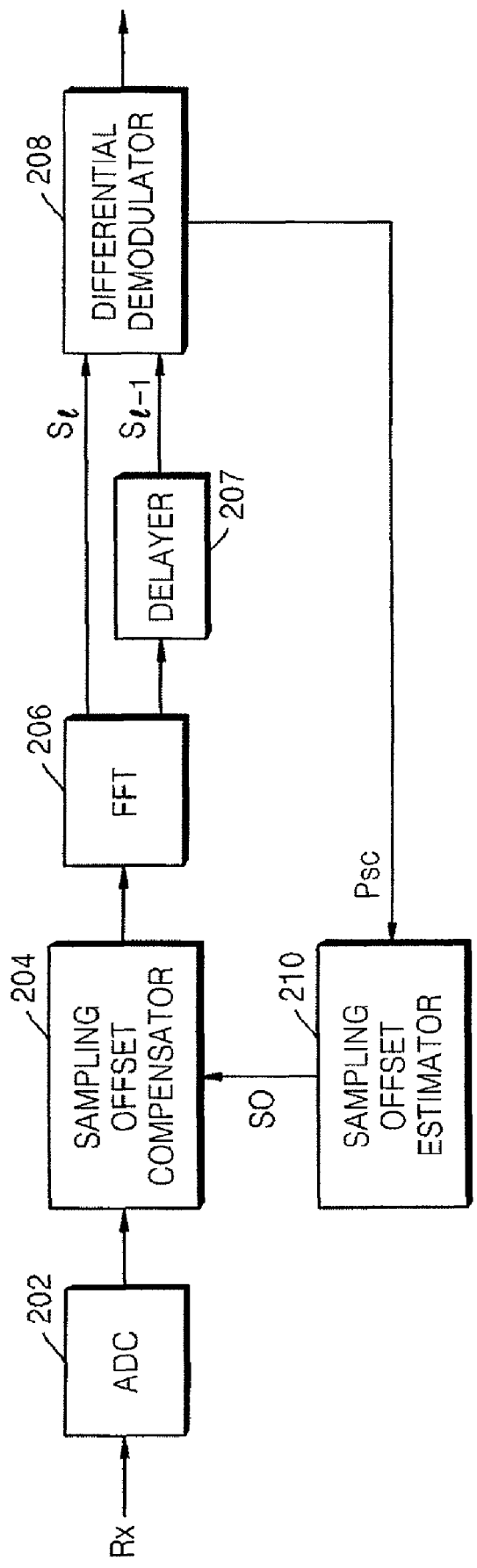
FIG. 2 is a block diagram illustrating part of a receiver which is used in an OFDM/DQPSK system.
Figure 3:
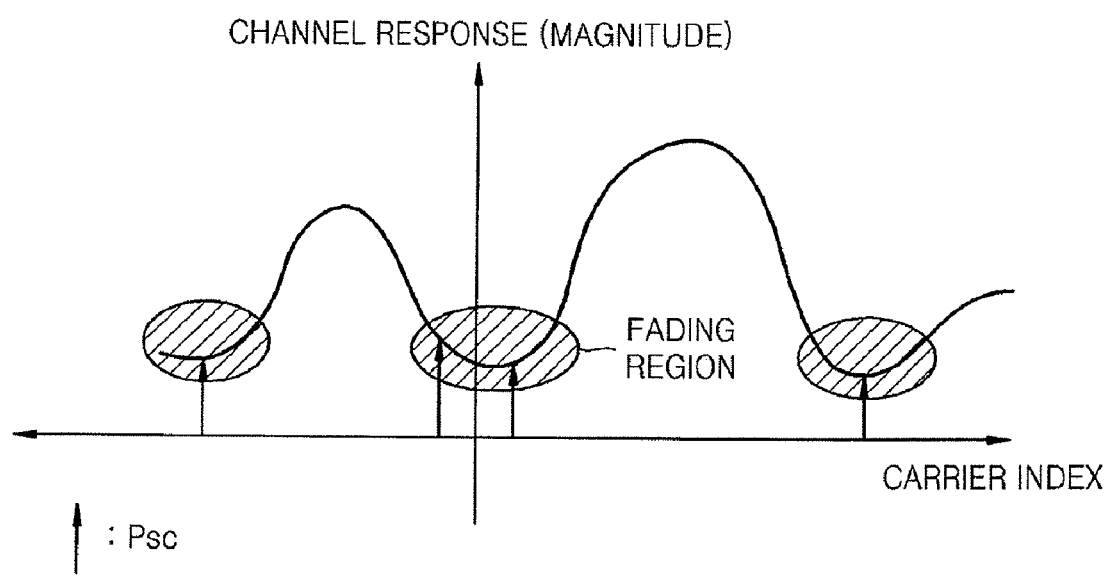
FIG. 3 is a view illustrating response characteristics of a fading channel.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 4:
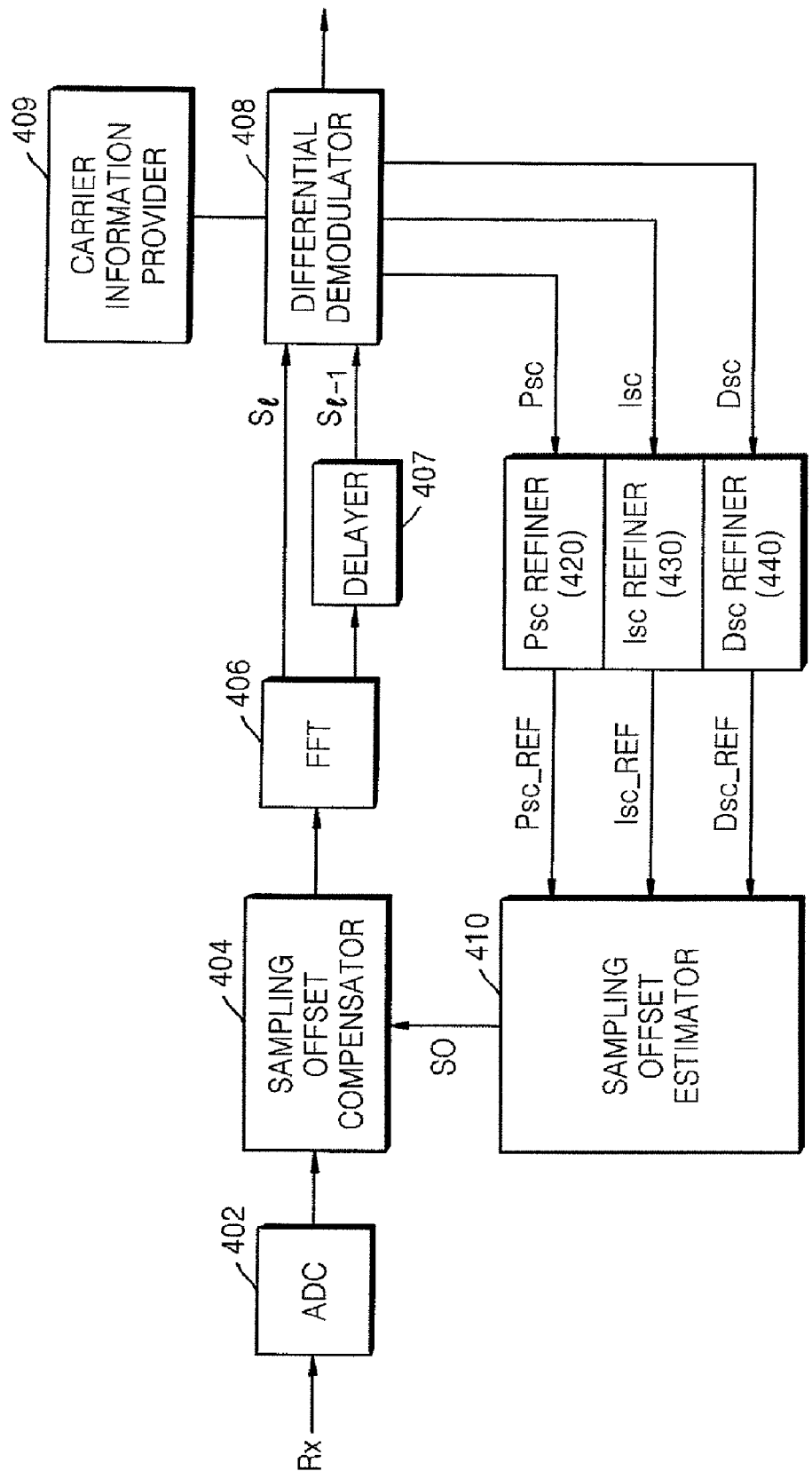
FIG. 4 is a block diagram illustrating a receiver including a sampling offset estimation apparatus according to an embodiment of the present general inventive concept.

FIG. 4 is a block diagram illustrating a receiver including a sampling offset estimation apparatus according to an embodiment of the present general inventive concept. Referring to FIG. 4, the receiver includes an analog-digital converter (ADC) 402 to convert a received analog signal Rx into a digital signal, a sampling offset compensator 404 to compensate for a sampling offset, a Fast Fourier Transform (FFT) block 406 to perform a FFT, a delayer 407 to delay symbols, a differential demodulator 408 to receive a current symbol $S_I$ and a previous symbol $S_{I-1}$ and to perform differential demodulation on the current symbol $S_I$ and the previous symbol $S_{I-1}$, a carrier information provider unit 409 to provide sub carrier information according to carrier indexes, a sampling offset estimator 410, a pilot sub-carrier refiner 420, a information sub-carrier refiner 430, and a data sub-carrier refiner 440.

In FIG. 4, the sampling offset estimator 410, the pilot sub-carrier refiner 420, the information sub-carrier refiner 430, and the data sub-carrier refiner 440 are units of the sampling offset estimation apparatus according to the current embodiment.

The carrier information provider unit 409 stores sub-carrier information according to carrier indexes. The sub-carrier information indicates that an x-th sub-carrier is a pilot sub-carrier Psc, a y-th sub-carrier is an information sub carrier Isc, and a z-th sub-carrier is a data sub-carrier Dsc.

The differential demodulator 408 receives the sub-carrier information according to the carrier indexes from the carrier information provider unit 409. The differential demodulator 408 outputs a pilot sub-carrier Psc, an information sub-carrier Isc, and a data sub-carrier Dsc which are extracted from a differential demodulated signal, respectively to the pilot sub-carrier refiner 420, the information sub-carrier refiner 430, and the data sub-carrier refiner 440.

If a sub-carrier X which is sent from a transmitter of an Orthogonal Frequency Division Multiplexing/Differential Quadrature Phase Shift Keying (OFDM/DQPSK) system can be expressed by Equation 1 below, a sub-carrier Y which is received by a receiver of the OFDM/DQPSK system can be expressed by Equation 2 below. Also, a sub-carrier C which is included in a differential demodulated signal of the differential demodulator 408 can be expressed by Equation 3 below.

$$X_{I,k} = A\,\exp(j\theta_{I,k}) = A\,\exp(j\theta_{I-1,k})\cdot\exp(j\theta_{d,k})$$

$$X_{I-1,k} = A\,\exp(j\theta_{I-1,k})$$

$$\text{where } \theta_{I,k} = \theta_{I-1,k} + \theta_d,\ \theta_d = \pi/4, -\pi/4, 3\pi/4, -3\pi/4 \quad (1)$$

where,
I: symbol index
k: carrier index
A: magnitude of sub-carrier
$\theta_d$: phase difference between sub-carriers $$Y_{I,k} = X_{I,k} H_{I,k} + \text{Noise}$$

$$Y_{I-1,k} = X_{I-1,k} H_{I-1,k} + \text{Noise} \quad (2)$$

where,
I: symbol index
k: carrier index
H: transfer function of transfer channel $$C_{I,k} = Y_{I,k} \cdot Y^*_{I-1,k} = |A|^2 \cdot |H_{I,k}|^2 \cdot \exp(j\theta_d) + \text{Noise} \quad (3)$$

$$\begin{aligned}
Y_{I,k} \cdot Y^*_{I-d,k} &= |A|^2 \cdot |H_{I,k}|^2 \cdot \exp(j\theta_{d,k}) \cdot \exp\!\left(j\frac{2\cdot\pi\cdot k}{N}\cdot N_s d\cdot\zeta\right)\cdot\\
&\quad \exp\!\left(j\frac{2\cdot\pi\cdot \Delta k}{N}\cdot N_s\cdot(1+\zeta)\right) + \text{Noise}\\
&= |A|^2 \cdot |H_{I,k}|^2 \cdot \exp(j\theta_{d,k})\cdot\exp\\
&\quad \left(j\frac{2\cdot\pi\cdot N_s}{N}(kd\zeta + \Delta k + \Delta k\cdot\zeta)\right) + \text{Noise}\\
&\cong |A|^2 \cdot |H_{I,k}|^2 \cdot \exp(j\theta_{d,k})\cdot\\
&\quad \exp\!\left(j\frac{2\cdot\pi\cdot N_s}{N}(kd\zeta + \Delta k)\right) + \text{Noise}
\end{aligned}$$

where,
I: symbol index
A: magnitude of sub-carrier
H: transfer function of transfer channel
Ns: length of symbol
N: size of FFT
d: number of symbol delay
$\zeta$: sampling offset
$\Delta k$: carrier interval or frequency offset by carrier interval In Equation 3, subscript d means symbol delay. In general case, d is 1, i.e., (L)th symbol and (L−d)th symbol are consecutive symbols.

The pilot sub-carrier refiner 420 refines the pilot sub-carrier Psc extracted from the differential demodulated signal, and generates a reference pilot sub-carrier Psc_REF. Details of the pilot sub-carrier refiner 420 will be described later with reference to FIGS. 5A and 5B. The information sub-carrier refiner 430 refines the information sub-carrier Isc extracted from the differential demodulated signal, and generates a reference information sub-carrier Isc_REF. Details of the information sub-carrier refiner 430 will be described later with reference to FIGS. 6A and 6B. The data sub-carrier refiner 440 refines the data sub-carrier Dsc extracted from the differential demodulated signal, and generates a reference data sub-carrier Dsc_REF. Details of the data sub-carrier refiner 440 will be described later with reference to FIGS. 7A, 7B, and 7C.

The sampling offset estimator 410 estimates a sampling offset SO included in the differential demodulated signal on a basis of the reference pilot sub-carrier Psc_REF, the reference information sub-carrier Isc_REF, and the reference data sub-carrier Dsc_REF. The sampling offset estimator 410 will be described later with reference to FIGS. 8A, 8B, and 8C. The sampling offset compensator 404 receives the sampling offset SO or indicating information of the sampling offset from the sampling offset estimator 410. The sampling offset compensator 404 performs a sampling offset compensation operation to remove the sampling offset SO.

Figure 5A:
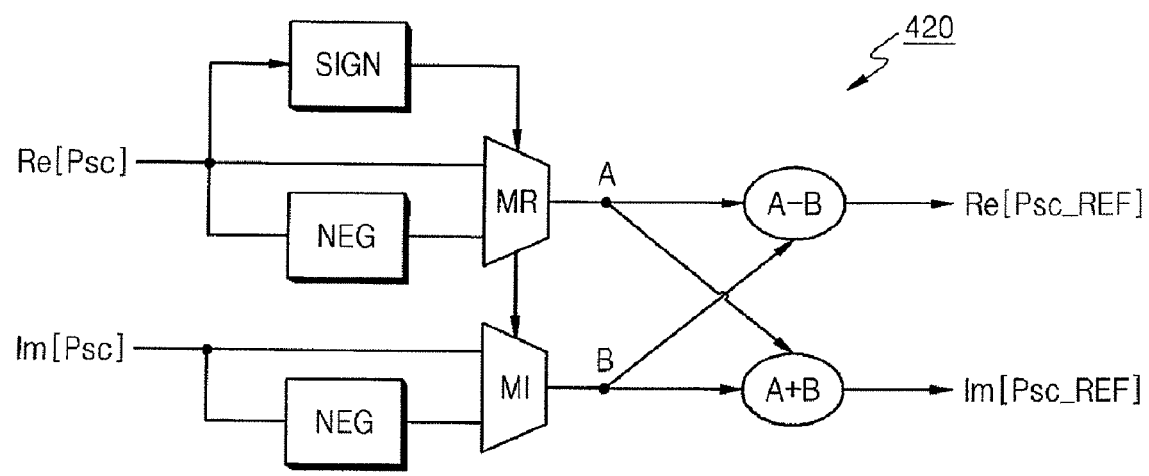
FIG. 5A is a block diagram illustrating a pilot sub-carrier refiner illustrated in FIG. 4.
Figure 5B:
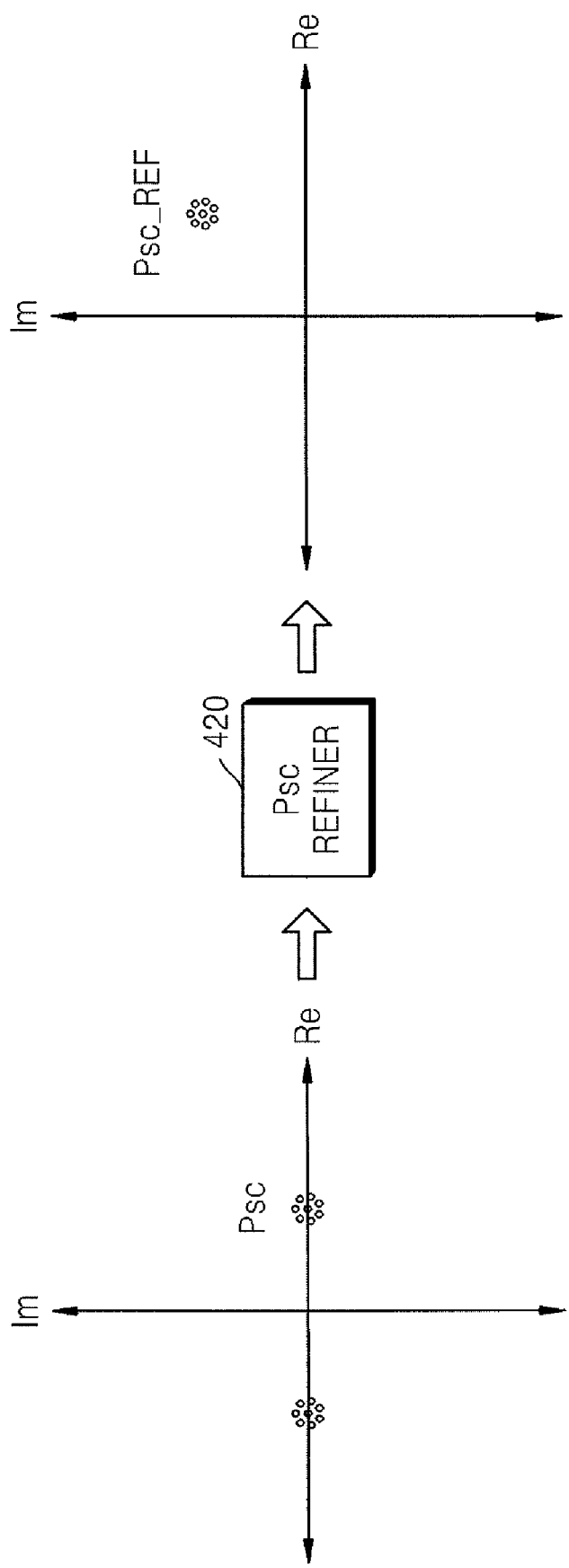
FIG. 5B is a view illustrating a refining operation performed by the pilot sub-carrier refiner in FIG. 4.

FIG. 5A is a block diagram illustrating the pilot sub-carrier refiner 420 illustrated in FIG. 4, and FIG. 5B is a view illustrating a refining operation of the pilot sub-carrier refiner 420.

The pilot sub-carrier Psc which is extracted from the differential demodulated signal in the receiver of the OFDM/DQPSK system has a phase near 0 or π, as illustrated in FIG. 5B. The pilot sub-carrier refiner 420 refines the pilot sub carrier Psc, and generates a reference pilot sub-carrier Psc_REF having a phase near a predetermined reference phase. FIG. 5B illustrates that the predetermined reference phase is π/4, but the predetermined reference phase may be set to −(π/4), +(3π/4), −(3π/4), etc.

In FIG. 5A, the pilot sub-carrier refiner 420 refines the pilot sub-carrier Psc having the phase near 0 or π to the reference pilot sub-carrier Psc_REF having the phase near π/4. The pilot sub-carrier refiner 420 illustrated in FIG. 5A includes a real component multiplexer MR, an imaginary component multiplexer MI, a subtractor A−B, an adder A+B, a sign determining unit SIGN, and two sign reversing units NEG.

If the sign of the real component value Re[Psc] is positive (+), the real component multiplexer MR outputs the real component value Re[Psc] of the pilot sub-carrier Psc. If the sign of the real component value Re[Psc] is negative (−), the real component multiplexer MR outputs the sign reversed value of the real component value Re[Psc]. For example, the sign reversed value of a real component value −1 is +1. The sign reversing unit NEG generates the sign reversed value of the real component value Re[Psc].

If the sign of the real component value Re[Psc] is positive (+), the imaginary component multiplexer MI outputs the imaginary component value Im[Psc]. If the sign of the real component value Re[Psc] is negative (−), the imaginary component multiplexer MI outputs the sign reversed value of the imaginary component value Im[Psc]. The sign reversing unit NEG generates the sign reversed value of the imaginary component value Im[Psc].

The subtractor A−B subtracts the output value B of the imaginary component multiplexer MI from the output value A of the real component multiplexer MR, and outputs the result of the subtraction as a real component value Re[Psc_REF] of a reference pilot sub-carrier Psc_REF. The adder A+B adds the output value B of the imaginary component multiplexer MI to the output value A of the real component multiplexer MR, and outputs the result of the addition as an imaginary component value Im[Psc_REF] of the reference pilot sub-carrier Psc_REF.

To generate a reference pilot sub-carrier Psc_REF, the pilot sub-carrier refiner 420 illustrated in FIG. 5A rotates a pilot sub-carrier Psc having a phase near 0 by $\pi/4$, or rotates a pilot sub-carrier Psc having a phase near $\pi$ by $5\pi/4$, thus generating a reference pilot sub-carrier Psc_REF.

Figure 6A:
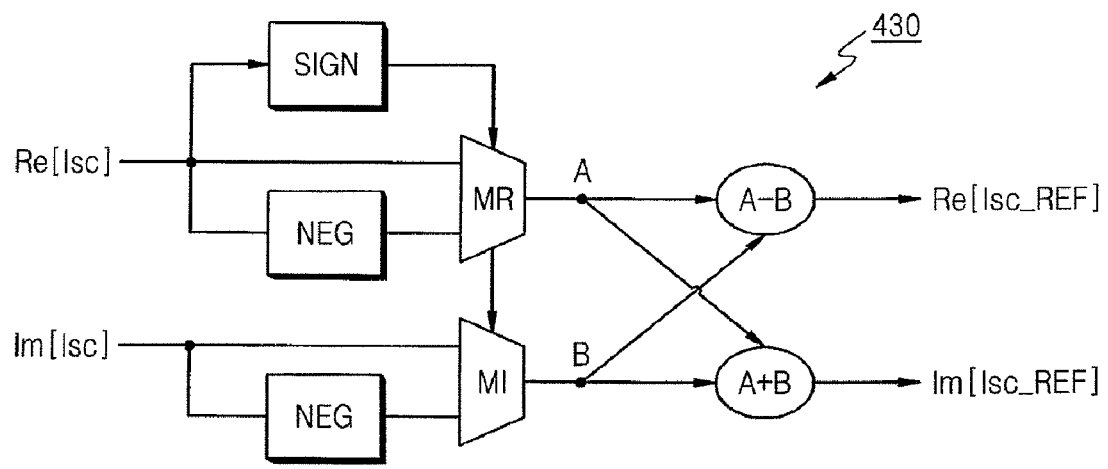
FIG. 6A is a block diagram illustrating an information sub-carrier refiner illustrated in FIG. 4.
Figure 6B:
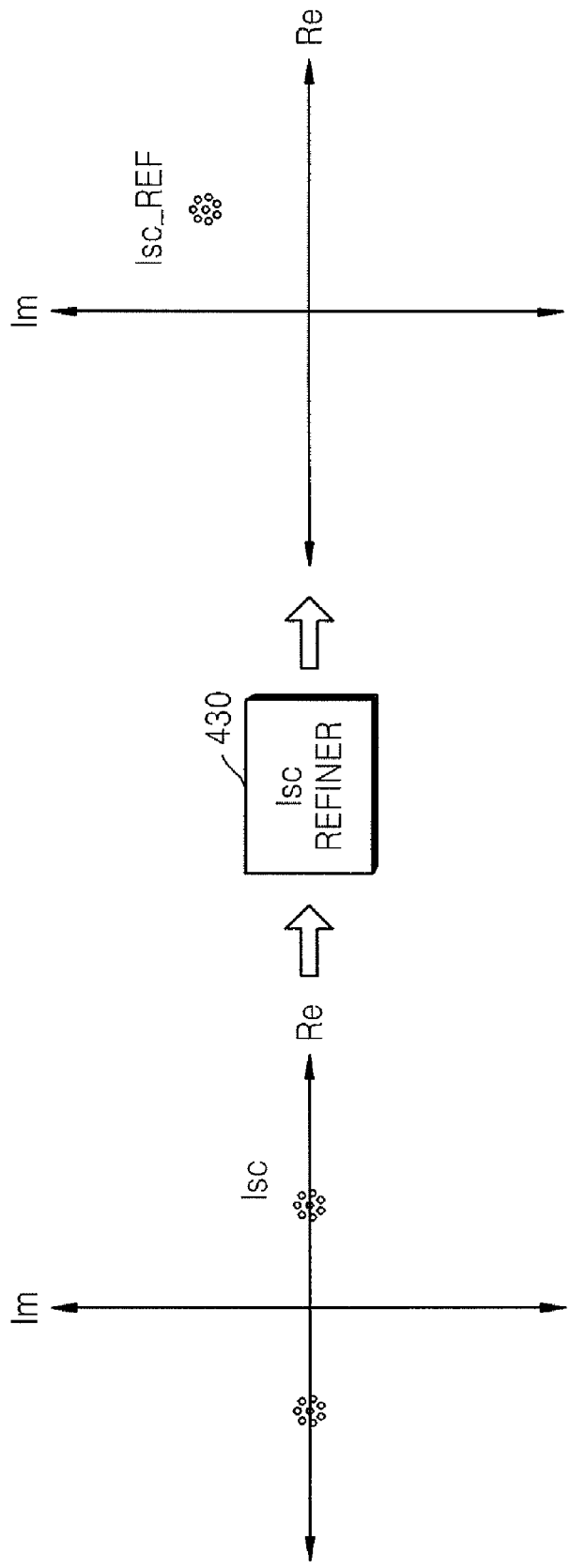
FIG. 6B is a view illustrating a refining operation performed by the information sub-carrier refiner in FIG. 4.

FIG. 6A is a block diagram illustrating the information sub-carrier refiner 430 illustrated in FIG. 4, and FIG. 6B is a view illustrating a refining operation of the information sub-carrier refiner 430.

The information sub-carrier Isc which is extracted from the differential demodulated signal in the receiver of the OFDM/DQPSK system has a phase near 0 or $\pi$, as illustrated in FIG. 6B. The information sub-carrier refiner 430 refines an information sub-carrier Isc having a phase near 0 or $\pi$, and generates a reference information sub-carrier Isc_REF having a phase near a predetermined reference phase. FIG. 6B illustrates that the predetermined reference phase is $\pi/4$, but the predetermined reference phase may be set to $-(\pi/4)$, $+(3\pi/4)$, $-(3\pi/4)$, etc.

In FIG. 6A, the information sub-carrier refiner 430 refines an information sub-carrier Isc having a phase near 0 or $\pi$, to a reference information sub-carrier Isc_REF having a phase near $\pi/4$. The information sub-carrier refiner 430 includes a real component multiplexer MR, an imaginary component multiplexer MI, a subtractor A−B, an adder A+B, a sign determining unit SIGN, and two sign reversing units NEG.

If the sign of the real component value Re[Isc] is positive (+), the real component multiplexer MR outputs the real component value Re[Isc] of the information sub-carrier Isc. If the sign of the real component value Re[Isc] is negative (−), the real component multiplexer MR outputs the sign reversed value of the real component value Re[Isc].

If the sign of the real component value Re[Isc] is positive (+), the imaginary component multiplexer MI outputs the imaginary component value Im[Isc]. If the sign of the real component value Re[Isc] is negative (−), the imaginary component multiplexer MI outputs the sign reversed value of the imaginary component value Im[Isc]. The subtractor A−B subtracts the output value B of the imaginary component multiplexer MI from the output value A of the real component multiplexer MR, and outputs the result of the subtraction as a real component value Re[Isc_REF] of a reference information sub-carrier Isc_REF. The adder A+B adds the output value B of the imaginary component multiplexer MI to the output value A of the real component multiplexer MR, and outputs the result of the addition as an imaginary component value Im[Isc_REF] of the reference information sub-carrier Isc_REF.

Like the pilot sub-carrier refiner 420 illustrated in FIG. 5A, the information sub-carrier refiner 430 illustrated in FIG. 6A rotates an information sub-carrier Isc having a phase near 0 by $\pi/4$, or rotates an information sub-carrier Isc having a phase near $\pi$ by $5\pi/4$, thus generating a reference information sub-carrier Isc_REF.

Figure 7A:
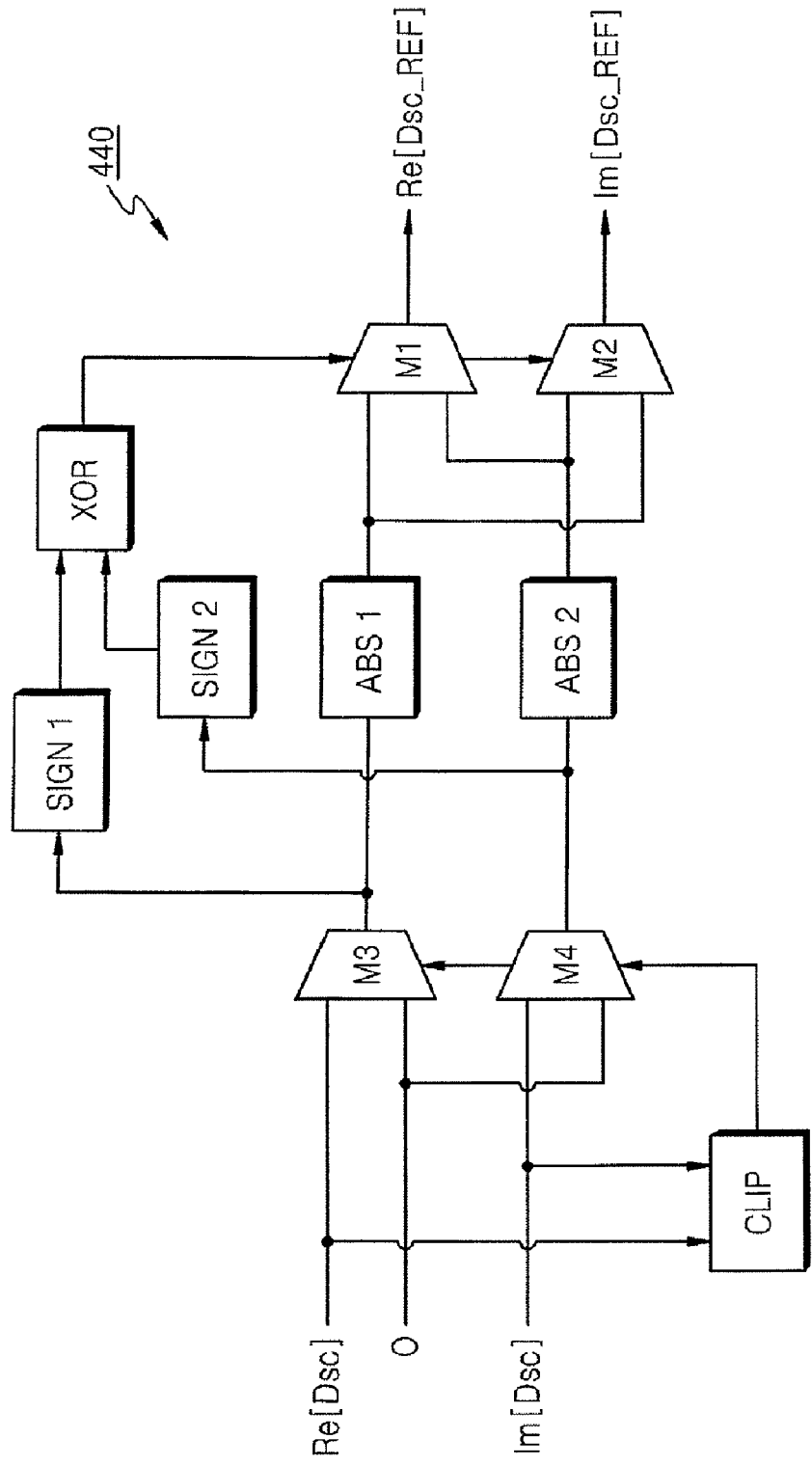
FIG. 7A is a block diagram illustrating a data sub-carrier refiner illustrated in FIG. 4.
Figure 7B:
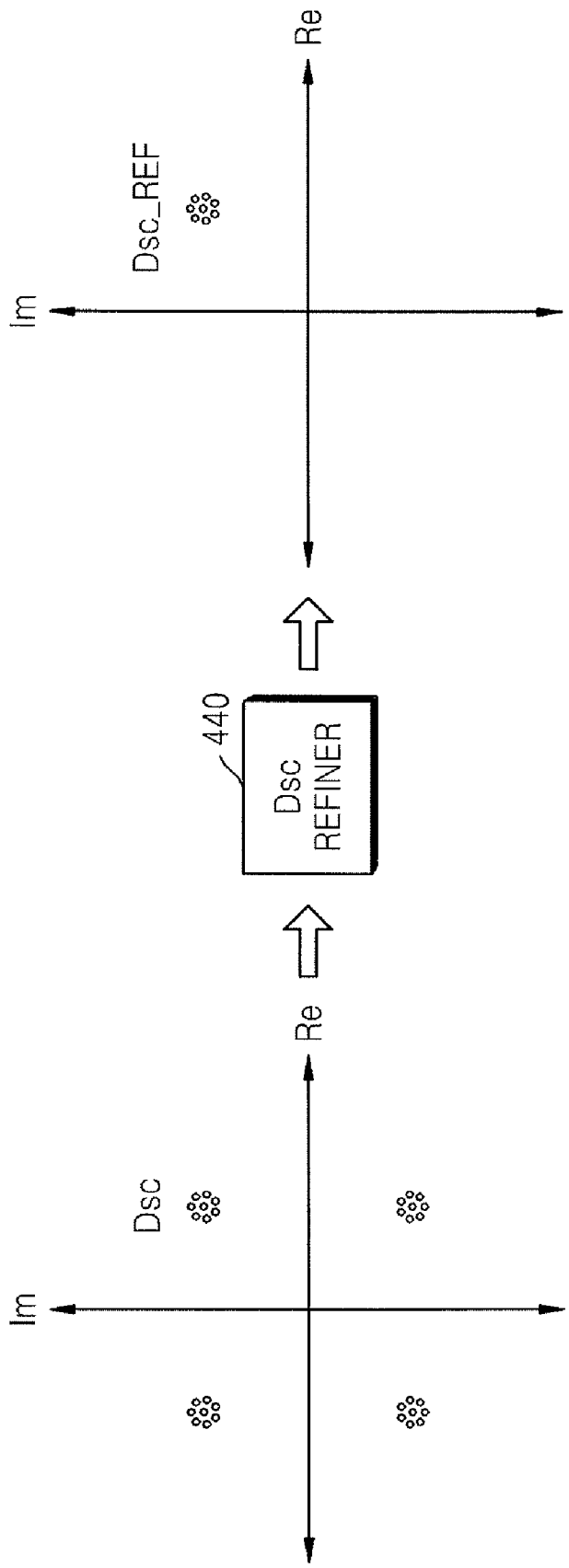
FIG. 7B is a view illustrating a refining operation performed by the data sub-carrier refiner in FIG. 4.

FIG. 7A is a block diagram illustrating the data sub-carrier refiner 440 illustrated in FIG. 4, and FIG. 7B is a view illustrating a refining operation of the data sub-carrier refiner 440.

The data sub-carrier Dsc which is extracted from the differential demodulated signal in the receiver of the OFDM/DQPSK system has a phase near $+(\pi/4)$, $-(\pi/4)$, $+(3\pi/4)$, or $-(3\pi/4)$, as illustrated in FIG. 7B. The data sub-carrier refiner 440 refines the data sub-carrier Dsc having the phase near $+(\pi/4)$, $-(\pi/4)$, $+(3\pi/4)$, or $-(3\pi/4)$, and generates a reference data sub-carrier Dsc_REF having a phase near a predetermined reference phase. FIG. 7B illustrates that the predetermined reference phase is $\pi/4$, but the predetermined reference phase may be set to $-(\pi/4)$, $+(3\pi/4)$, $-(3\pi/4)$, etc.

In FIG. 7A, the data sub-carrier refiner 440 refines a data sub-carrier Dsc having a phase near $+(\pi/4)$, $-(\pi/4)$, $+(3\pi/4)$, or $-(3\pi/4)$, to a reference data sub-carrier Dsc_REF having a phase near $\pi/4$. The data sub-carrier refiner 440 includes a first absolute value calculator ABS1, a second absolute value calculator ABS2, a first multiplexer M1, a second multiplexer M2, a first sign determining unit SIGN1, a second sign determining unit SIGN2, and an XOR calculator XOR. Also, the data sub-carrier refiner 440 can further include a third multiplexer M3, a fourth multiplexer M4, and a clipping controller CLIP.

The first absolute value calculator ABS1 outputs the absolute value of a real component value Re[Dsc] of the data sub-carrier Dsc. The second absolute value calculator ABS2 outputs the absolute value of an imaginary component value Im[Dsc] of the data sub-carrier Dsc.

The first multiplexer M1 outputs the output value of the first absolute value calculator ABS1 or the output value of the second absolute value calculator ABS2, as a real component value Re[Dsc_REF] of a reference data sub-carrier Dsc_REF. If the sign of a real component value Re[Dsc] of the data sub-carrier Dsc is the same as the sign of an imaginary component value Im[Dsc] of the data sub-carrier Dsc, the first multiplexer M1 outputs the output value of the first absolute value calculator ABS1 as a real component value Re[Dsc_REF] of a reference sub-carrier Dsc_REF. If the sign of a real component value Re[Dsc] of the data sub-carrier Dsc is different from the sign of an imaginary component value Im[Dsc] of the data sub-carrier Dsc, the first multiplexer M1 outputs the output value of the second absolute calculator ABS2 as a real component value Re[Dsc_REF] of a reference sub-carrier Dsc_REF.

The second multiplexer M2 outputs the output value of the second absolute value calculator ABS2 or the output value of the first absolute value calculator ABS1, as an imaginary component value Im[Dsc_REF] of the reference data sub-carrier Dsc_REF. If the sign of a real component value Re[Dsc] of the data sub-carrier Dsc is the same as the sign of an imaginary component value Im[Dsc] of the data sub-carrier Dsc, the second multiplexer M2 outputs the output value of the second absolute value calculator ABS2, as an imaginary component value Im[Dsc_REF] of a reference data sub-carrier Dsc_REF. If the sign of a real component value Re[Dsc] of the data sub-carrier Dsc is different from the sign of an imaginary component value Im[Dsc] of the data sub-carrier Dsc, the second multiplexer M2 outputs the output value of the first absolute value calculator ABS1, as an imaginary component value Im[Dsc_REF] of a reference data sub-carrier Dsc_REF In order to control the outputs of the first and second multiplexers M1 and M2, the data sub-carrier refiner 440 further includes the first sign determining unit SIGN1, the second sign determining unit SIGN2, and the XOR calculator XOR. The first sign determining unit SIGN1 determines the sign of the real component value Re[Dsc] of the data sub-carrier Dsc. The second sign determining unit SIGN2 determines the sign of the imaginary component value Im[Dsc] of the data sub-carrier Dsc. The XOR calculator XOR controls the output of the first multiplexer M1 and the output of the second multiplexer M2, on the basis of the output value of the first sign determining unit SIGN1 and the output value of the second sign determining unit SIGN2. That is, the XOR calculator XOR performs an XOR operation on the output value of the first sign determining unit SIGN1 and the output value of the second sign determining unit SIGN2, and outputs the result of the XOR operation as a control signal to the first multiplexer M1 and the second multiplexer M2.

The data sub-carrier refiner 440 illustrated in FIG. 7A rotates a data sub-carrier Dsc having a phase near $\pi/4$ by 0, rotates a data sub-carrier Dsc having a phase near $3\pi/4$ by $6\pi/4$, rotates a data sub-carrier Dsc having a phase near $-(3\pi/4)$ by $4\pi/4$, and rotates a data sub-carrier Dsc having a phase near $-(\pi/4)$ by $2\pi/4$, thus generating a reference data sub-carrier Dsc_REF.

Meanwhile, when data sub-carriers Dsc are extracted from the differential demodulated signal to generate the reference data sub-carrier Dsc_REF, data sub-carriers Dsc with magnitudes not within a predetermined valid range may be removed. Further details will be described below with reference to FIG. 7C.

Figure 7C:
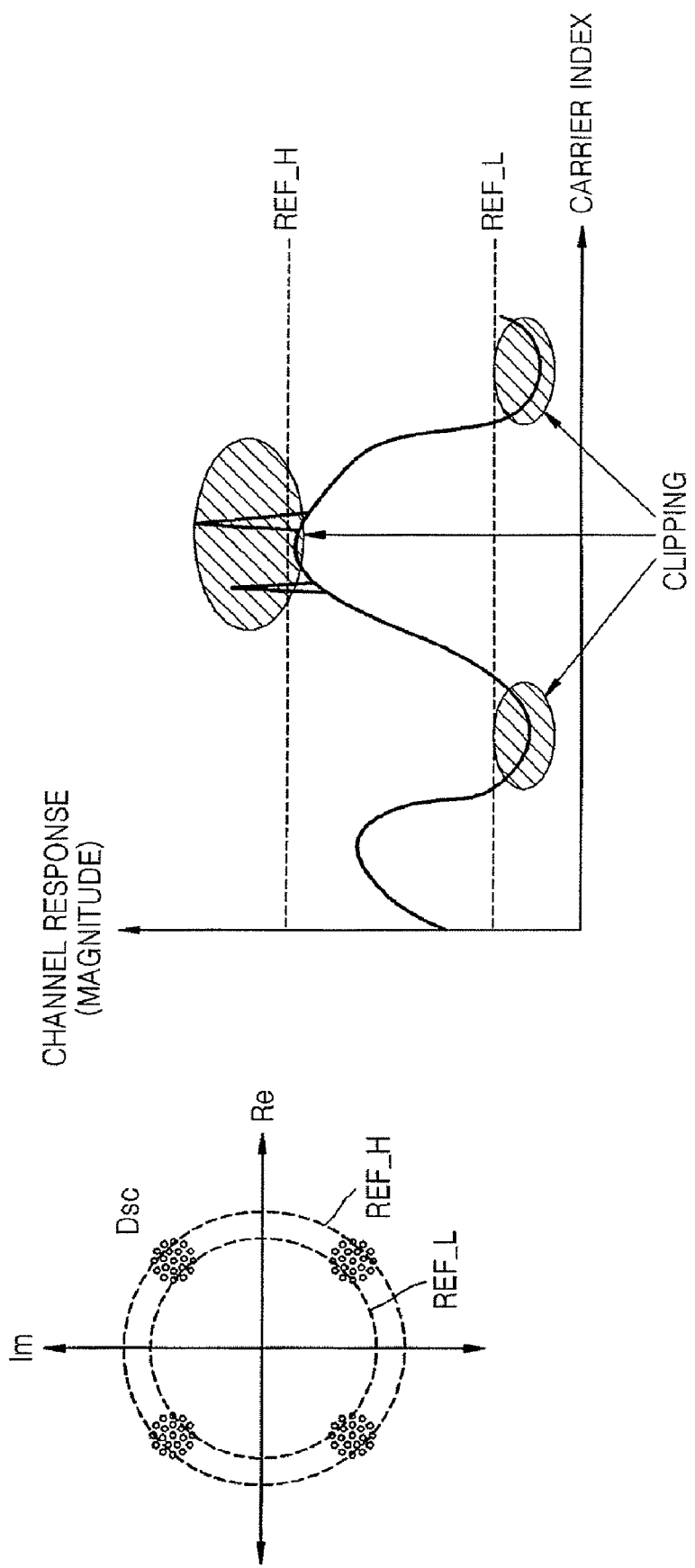
FIG. 7C is a view illustrating a clipping operation which is performed by a clipping controller illustrated in FIG. 7A.

FIG. 7C is a view illustrating a clipping operation which is performed by the clipping controller CLIP illustrated in FIG. 7A.

As illustrated in FIG. 7C, a magnitude of a certain sub-carrier may be smaller than a predetermined minimum valid value REF_L, due to the fading characteristics of a channel, or may be larger than a predetermined maximum valid value REF_H, due to the influence of noise, etc. If a sampling offset SO is estimated on a basis of sub-carriers with magnitudes not within a predetermined valid range from REF_L to REF_H, the accuracy of the estimation is greatly reduced. Accordingly, sub-carriers with magnitudes not within the predetermined valid range from REF_L to REF_H may be removed, and estimate a sampling offset SO on a basis of only sub-carriers with magnitudes within the predetermined valid range from REF_L to REF_H.

The third multiplexer M3, the fourth multiplexer M4, and the clipping controller CLIP illustrated in FIG. 7A perform an operation of selecting data sub-carriers with magnitudes within the predetermined valid range from REF_L to REF_H. The clipping controller CLIP controls the outputs of the third multiplexer M3 and the fourth multiplexer M4, on a basis of the magnitude of the data sub-carrier Dsc.

The third multiplexer M3 outputs a real component value Re[Dsc] of the data sub-carrier Dsc or a value "0" to the first absolute value calculator ABS1. If the magnitude of the data sub-carrier Dsc is within the predetermined valid range from REF_L to REF_H, the third multiplexer M3 outputs a real component value Re[Dsc] of the data sub-carrier Dsc. If the magnitude of the data sub-carrier Dsc is not within the predetermined valid range from REF_L to REF_H, the third multiplexer M3 outputs a value "0".

The fourth multiplexer M4 outputs an imaginary component value Im[Dsc] of the data sub-carrier Dsc or a value "0" to the second absolute value calculator ABS2. If a magnitude of the data sub-carrier Dsc is within the predetermined valid range from REF_L to REF_H, the fourth multiplexer M4 outputs an imaginary component value Im[Dsc] of the data sub-carrier Dsc. If the magnitude of the data sub-carrier Dsc is not within the predetermined valid range from REF_L to REF_H, the fourth multiplexer M4 outputs a value "0".

Figure 8A:
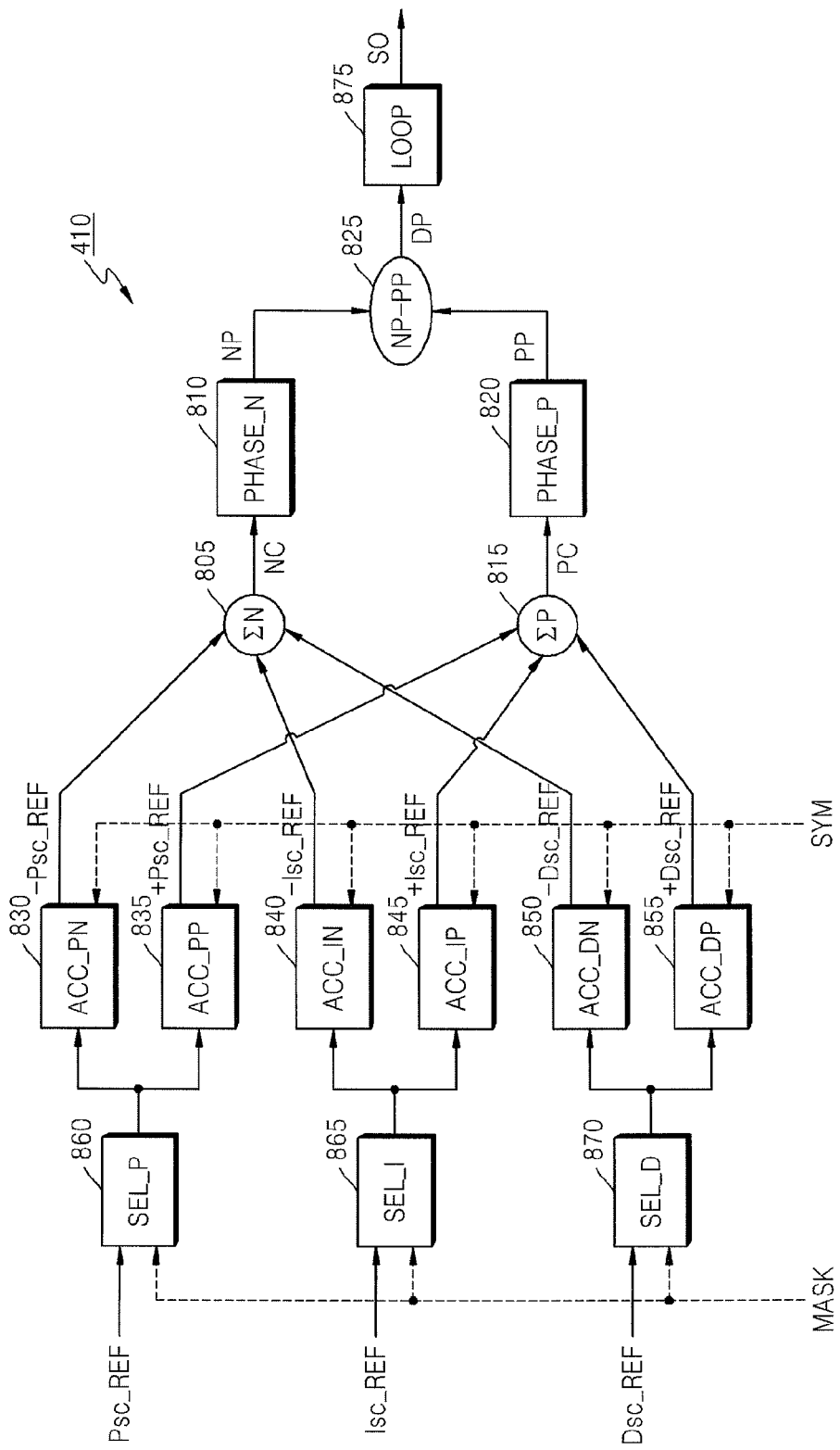
FIG. 8A is a block diagram illustrating a sampling offset estimator illustrated in FIG. 4.

FIG. 8A is a view illustrating the sampling offset estimator 410 illustrated in FIG. 4.

Referring to FIG. 8A, the sampling offset estimator 410 includes a first carrier adder $\Sigma$N 805, a first phase detector PHASE_N 810, a second carrier adder $\Sigma$P 815, a second phase detector PHASE_P 820, a subtractor NP-PP 825, a first pilot carrier accumulator ACC_PN 830, a second pilot carrier accumulator ACC_PP 835, a first information carrier accumulator ACC_IN 840, a second information carrier accumulator ACC_IP 845, a first data carrier accumulator ACC_DN 850, a second data carrier accumulator ACC_DP 855, a pilot carrier selector SEL_P 860, an information carrier selector SEL_I 865, and a data carrier selector SEL_D 870. In FIG. 8A, the first carrier adder $\Sigma$N 805 and the second carrier adder $\Sigma$P 815 can be implemented using an adding unit or an averaging unit.

The first carrier adder $\Sigma$N 805 adds reference pilot sub-carriers −Psc_REF having negative (−) carrier indexes, reference information sub-carriers −Isc_REF having negative (−) carrier indexes, and reference data sub-carriers −Dsc_REF having negative (−) carrier indexes. The first phase detector PHASE_N 810 detects the phase of an output value NC of the first carrier adder $\Sigma$N 805, and outputs a first phase detection value NP. The second carrier adder $\Sigma$P 815 adds reference pilot sub-carriers +Psc_REF having positive (+) carrier indexes, reference information sub-carriers +Isc_REF having positive (+) carrier indexes, and reference data sub-carriers +Dsc_REF having positive (+) carrier indexes. The second phase detector PHASE_P 820 detects the phase of an output value PC of the second carrier adder $\Sigma$P 815, and generates a second phase detection value PP. The subtractor NP-PP 825 outputs a difference DP between the first phase detection value NP and the second phase detection value PP, as indicating information of a sampling offset SO.

The sampling offset estimator 410 can further include a loop filter LOOP 875 to perform loop-filtering on the difference DP, and to output the result of the loop-filtering as the sampling offset SO, as illustrated in FIG. 8A. The sampling offset estimator 410 can output the difference DP as indicating information of a sampling offset, or can output a value obtained by performing loop filtering on the difference DP as a sampling offset SO.

In the current embodiment, reference pilot sub-carriers −Psc_REF having negative (−) carrier indexes, reference information sub-carriers −Isc_REF having negative (−) carrier indexes, and reference data sub-carriers −Dsc_REF having negative (−) carrier indexes, which are included in a symbol, are input to the first carrier adder $\Sigma$N 805. However, according to another embodiment, the same signals can be accumulated for two or more symbol periods and then input to the first carrier adder $\Sigma$N 805. Likewise, according to other embodiments, it is possible that reference sub-carriers +Psc_REF, +Isc_REF, and +Dsc_REF having positive (+) carrier indexes, which are included in a symbol, are input to the second carrier adder $\Sigma$P 815, or are accumulated for two or more symbol periods and input to the second carrier adder $\Sigma$P 815.

A determination on whether to input reference sub-carriers accumulated for a symbol to a carrier adder for each symbol, or whether to input reference sub-carriers accumulated for two or more symbol periods to a carrier adder, depends on an accumulation control signal SYM. If reference sub-carriers are accumulated for two or more symbol periods and then input to a carrier adder, the accuracy of sampling offset estimation will be high, but a large amount of calculations will be required.

The first pilot carrier accumulator ACC_PN 830 accumulates reference pilot sub-carriers −Psc_REF having negative (−) carrier indexes for one or more symbol periods, and outputs the result of the accumulation to the first carrier adder $\Sigma$N. The second pilot carrier accumulator ACC_PP 835 accumulates reference pilot sub carriers +Psc_REF having positive (+) carrier indexes for one or more symbol periods, and outputs the result of the accumulation to the second carrier adder ΣP 815.

The first information carrier accumulator ACC_IN 840 accumulates reference information sub carriers −Isc_REF having negative (−) carrier indexes for one or more symbol periods, and outputs the result of the accumulation to the first carrier adder ΣN. The second information carrier accumulator ACC_IP 845 accumulates reference information sub-carriers +Isc_REF having positive (+) carrier indexes for one or more symbol periods, and outputs the result of the accumulation to the second carrier adder ΣP 815. The first data carrier accumulator ACC_DN 850 accumulates reference data sub-carriers −Dsc_REF having negative (−) carrier indexes for one or more symbol periods, and outputs the result of the accumulation to the first carrier adder ΣN 805. The second data carrier accumulator ACC_DP 855 accumulates reference data sub-carriers +Dsc_REF having positive (+) carrier indexes for one or more symbol periods, and outputs the result of the accumulation to the second carrier adder ΣP 815.

Figure 8B:
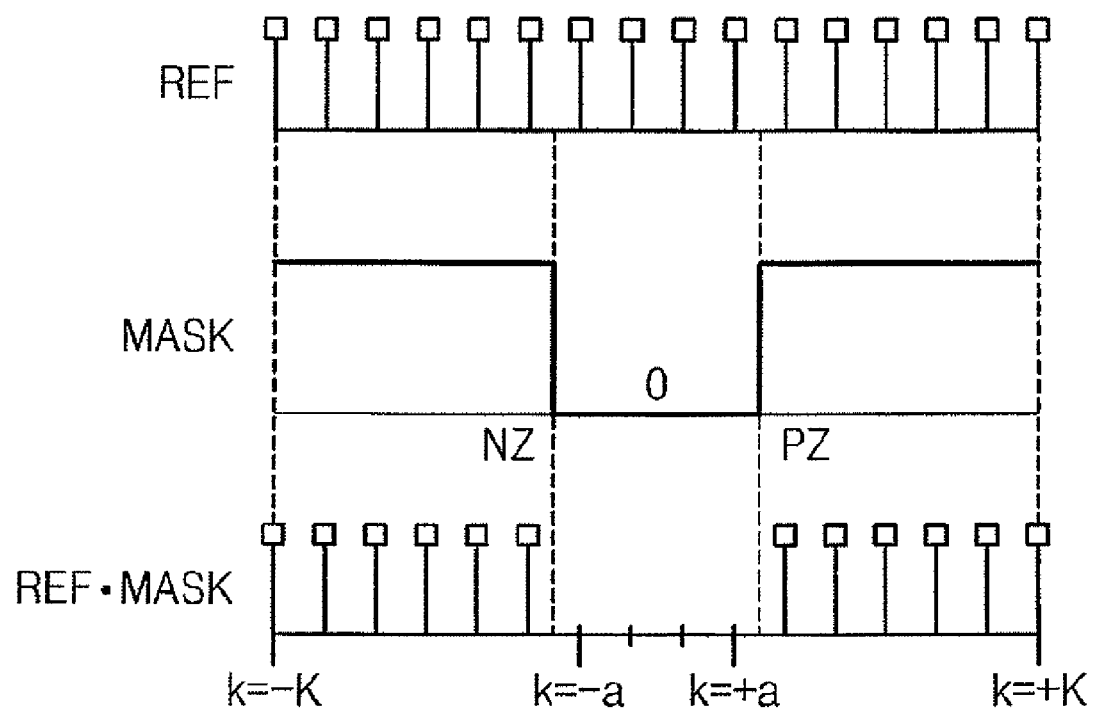
FIG. 8B is a view illustrating an operation of a pilot carrier selector, an information carrier selector, and a data carrier selector illustrated in FIG. 8A.

FIG. 8B is a view illustrating operations of the pilot carrier selector SEL_P 860, the information carrier selector SEL_I 865, and the data carrier selector SEL_D 870 illustrated in FIG. 8A.

In FIG. 8B, a carrier index k has a range from −K to +K (K≦k≦+K), wherein −K denotes a minimum carrier index and +K denotes a maximum carrier index. Sub-carriers with carrier indexes k (for example, −a≦k≦+a) near "0" are used to transmit components around direct current (for example, direct current components or components approaching direct current). However, when influence of white noise is considered, estimating a sampling offset from sub-carriers with carrier indexes k near "0" may lead to inaccurate results. If a sampling offset is estimated from sub-carriers with carrier indexes k near "0", estimation errors can increase.

Accordingly, according to the present general inventive concept, reference sub-carriers Psc_REF, Isc_REF, and Dsc_REF with carrier indexes k near "0" (for example, −a≦k≦+a) are excluded from data on which sampling offset estimation will be performed. As illustrated in FIG. 8B, it is possible to remove reference sub-carriers with carrier indexes k near "0" (for example, −a≦k≦+a), using a mask signal MASK. By multiplexing reference sub-carriers by the mask signal MASK, it is possible to reject reference sub-carriers which belong to a band from NZ to PZ.

The pilot carrier selector SEL_P 860, the information carrier selector SEL_I 865, and the data carrier selector SEL_D 870 illustrated in FIG. 8A perform the band-rejecting operation as described above.

The pilot carrier selector SEL_P 860 outputs the reference pilot sub-carriers other than those which belong to a predetermined removal region (for example, excluding reference pilot sub-carriers with carrier indexes k within a range of −a≦k≦+a, i.e. the band from NZ to PZ in FIG. 8B), to the first pilot carrier accumulator ACC_PN 830 or the second pilot carrier accumulator ACC_PP 835. That is, the pilot carrier selector SEL_P 860 outputs reference pilot sub-carriers with carrier indexes k within a range of −K≦k≦−(a+1) to the first pilot carrier accumulator ACC_PN 830, removes reference pilot sub-carriers with carrier indexes k within a range of a≦k≦+a, and outputs reference pilot sub-carriers with carrier indexes k within a range of (a+1)≦k≦+K to the second pilot carrier accumulator ACC_PP 835.

The information carrier selector SEL_I 865 outputs the reference information sub-carriers other than those which belong to a predetermined removal region, to the first information carrier accumulator ACC_IN 840 or the second information carrier accumulator ACC_IP 845. That is, the information carrier selector SEL_I 865 outputs reference information sub-carriers with carrier indexes k within the range of −K≦k≦−(a+1) to the first information carrier accumulator ACC_IN 840, removes reference information sub-carriers with carrier indexes k within the range of −a≦k≦+a, and outputs reference information sub-carriers with carrier indexes k within the range of (a+1)≦k≦+K to the second information carrier accumulator ACC_IP 845.

The data carrier selector SEL_D 870 outputs the reference data sub-carriers other than those which belong to a predetermined removal region, to the first data carrier accumulator ACC_DN 850 or the second data carrier accumulator ACC_DP 855. That is, the data carrier selector SEL_D 870 outputs reference data sub-carriers with carrier indexes k within the range of −K≦k≦−(a+1) to the first data carrier accumulator ACC_DN 850, removes reference data sub-carriers with carrier indexes k within the range of −a≦k≦+a, and outputs reference data sub-carriers with carrier indexes k within the range of (a+1)≦k≦+K to the second data carrier accumulator ACC_DP 855.

Figure 8C:
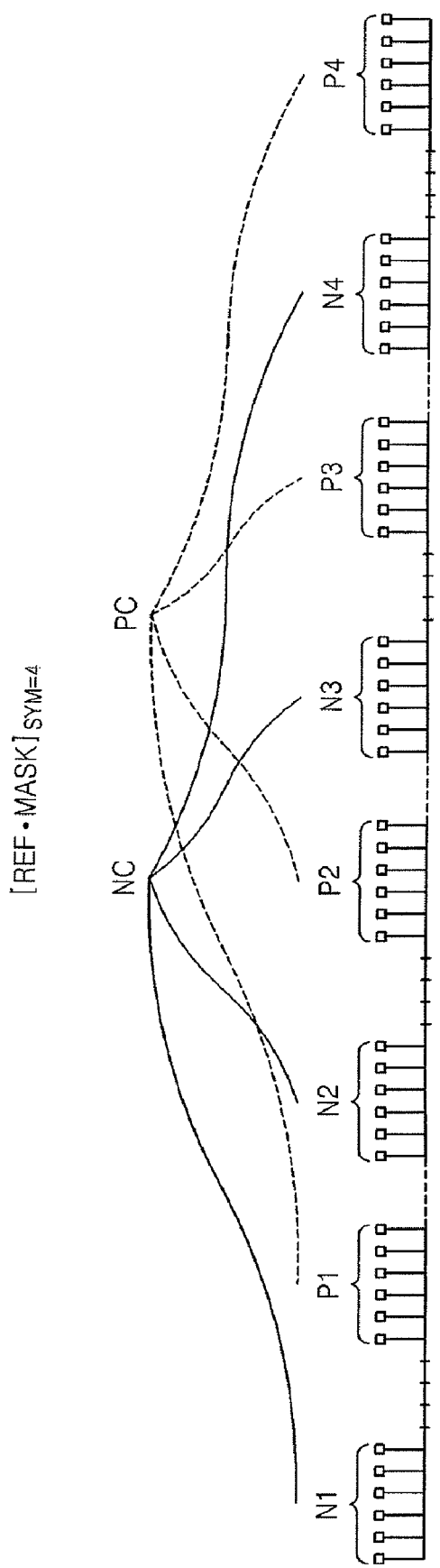
FIG. 8C is a view illustrating a method of blocking a band using a mask signal and adding reference sub-carriers accumulated for four symbol periods, according to an embodiment of the present general inventive concept.

FIG. 8C is a view illustrating a method of band-rejecting using a mask signal MASK and adding reference sub-carriers accumulated for four symbol periods, according to an embodiment of the present general inventive concept.

Reference sub-carriers (for example, reference sub-carriers with carrier indexes k near "0") belonging to a predetermined removal region are removed using a mask signal MASK. Also, reference pilot sub-carriers −Psc_REF having negative (−) carrier indexes, reference information sub-carriers −Isc_REF having negative (−) carrier indexes, and reference data sub-carriers −Dsc_REF having negative (−) carrier indexes, which are accumulated for four symbol periods, are added. The result (NC=N1+N2+N3+N4) of the addition is output to the first phase detector PHASE_N. Also, reference pilot sub-carriers +Psc_REF having positive (+) carrier indexes, reference information sub-carriers +Isc_REF having positive (+) carrier indexes, and reference data sub-carriers +Dsc_REF having positive (+) carrier indexes, which are accumulated for the four symbol periods, are added. The result (PC=P1+P2+P3+P4) of the addition is output to the second phase detector PHASE_P 820.

Figure 10:
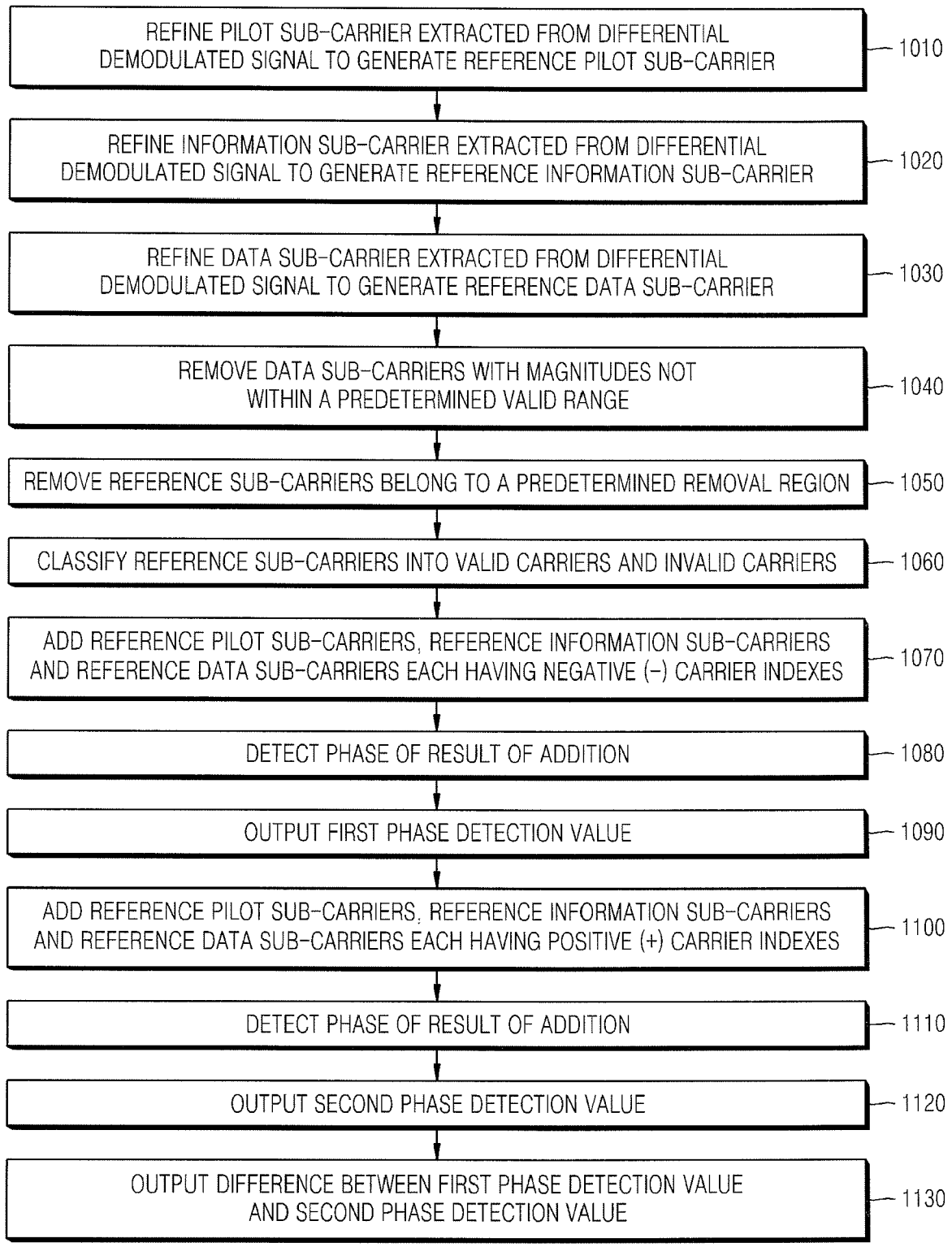

FIGS. 9 and 10 illustrates a method to estimate a sampling offset from reference sub-carriers Psc_REF, Isc_REF, and Dsc_REF, according to an embodiment of the present general inventive concept. The sampling offset estimation method will now be described with reference to FIGS. 9 and 10.

A pilot sub-carrier Psc extracted from a differential demodulated signal is refined to generate a reference pilot sub-carrier Psc_REF (operation 1010), an information sub-carrier Isc extracted from the differential demodulated signal is refined to generate a reference information sub-carrier Isc_REF (operation 1020), and a data sub-carrier Dsc extracted from the differential demodulated signal is refined to generate a reference data sub-carrier Dsc_REF (operation 1030). That is, a pilot sub-carrier Psc having a phase near 0 or π is refined to generate a reference pilot sub-carrier Psc_REF having a phase near π/4, a reference information sub-carrier Isc having a phase near 0 or π is refined to generate a reference information sub-carrier Isc_REF, and a data sub-carrier Dsc having a phase near +(π/4), −(π/4), +(3π/4), or −(3π/4) is refined to generate a reference data sub-carrier Dsc_REF having a phase near π/4.

The upper portion of FIG. 9 illustrates all the reference pilot sub-carriers Psc_REF, reference information sub-carriers Isc_REF, and reference data sub-carriers Dsc_REF, which have phases near π/4.

Data sub-carriers Dsc with magnitudes not within a predetermined valid range from REFL_L to REF_H are removed (operation 1040).

Also, reference sub-carriers belonging to a predetermined removal region from NZ to PZ (for example, reference sub-carriers with carrier indexes k within the range of $-a \leq k \leq +a$), among the reference sub-carriers Psc_REF, Isc_REF, and Dsc_REF, are removed (operation 1050).

In the upper portion of FIG. 9, the reference sub-carriers Psc_REF, Isc_REF, and Dsc_REF can be classified into valid carriers which are used to sample offset estimation and invalid carriers which are not used to sample offset estimation (operation 1060).

Then, reference pilot sub-carriers −Psc_REF having negative (−) carrier indexes, reference information sub-carriers −Isc_REF having negative (−) carrier indexes, and reference data sub-carriers −Dsc_REF having negative (−) carrier indexes are added (operation 1070), and the phase of the result NC of the addition is detected (operation 1080), so that a first phase detection value NP is output (operation 1090). Also, reference pilot sub-carriers +Psc_REF having positive (+) carrier indexes, reference information sub-carriers +Isc_REF having positive (+) carrier indexes, and reference data sub-carriers +Dsc_REF having positive (+) carrier indexes are added (operation 1100), and the phase of the result PC of the addition is detected (operation 1110), so that a second phase detection value PP is output (operation 1120). When the reference sub-carriers are added, an accumulation control signal (SYM in FIG. 8A) determines whether to add reference sub-carriers for each symbol or whether to add reference sub-carriers accumulated for two or more symbol periods.

Next, a difference DP between the first phase detection value NP and the second phase detection value PP is output as indicating information of a sampling offset (operation 1130). Alternatively, the difference DP between the first phase detection value NP and the second phase detection value PP can be subjected to loop-filtering, and then the result of the loop-filtering is output as a sampling offset SO.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The sampling offset estimation method according to various embodiments of the present general inventive concept can be applied to estimate a sampling offset which is included in a differential demodulated signal in a receiver of an OFDM/DQPSK system.

According to various embodiments of the present general inventive concept, it is possible to estimate a sampling offset on the basis of information sub-carriers and data sub-carriers as well as pilot sub-carriers in a receiver of an OFDM/DQPSK system. Also, by setting a predetermined valid range and a predetermined removal region and estimating a sampling offset using only selected sub-carriers, it is possible to accurately estimate a sampling offset included in a differential demodulated signal Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents

What is claimed is:

1. A sampling offset estimation apparatus, comprising:
a pilot sub-carrier refining unit to refine a pilot sub-carrier extracted from a differential demodulated signal, and to generate a reference pilot sub-carrier;
an information sub-carrier refining unit to refine an information sub-carrier extracted from the differential demodulated signal, and to generate a reference information sub-carrier;
a data sub-carrier refining unit to refine a data sub-carrier extracted from the differential demodulated signal, and to generate a reference data sub-carrier;
a sampling offset estimating unit to estimate a sampling offset included in the differential demodulated signal, on a basis of the reference pilot sub-carrier, the reference information sub-carrier, and the reference data sub-carrier,
wherein the pilot sub-carrier refining unit comprises:
a real component multiplexer to output a real component value of the pilot sub-carrier if a sign of the real component value is positive (+), and to reverse the sign of the real component value and to output the sign reversed value of the real component value if the sign of the real component value is negative (−);
an imaginary component multiplexer to output an imaginary component value of the pilot sub-carrier if the sign of the real component value is positive (+), and to reverse the sign of the imaginary component value and to output the sign reversed value of the imaginary component value if the sign of the real component value is negative (−);
a subtractor to subtract an output value of the imaginary component multiplexer from an output value of the real component multiplexer, and to output the result of the subtraction as a real component value of the reference pilot sub-carrier; and
an adder to add the output value of the imaginary component multiplexer to the output value of the real component multiplexer, and to output the result of the addition as an imaginary component value of the reference pilot sub-carrier.

2. The sampling offset estimation apparatus of claim 1, wherein:
the pilot sub-carrier extracted from the differential demodulated signal has a phase near 0 or $\pi$;
the information sub-carrier extracted from the differential demodulated signal has a phase near 0 or $\pi$; and
the data sub-carrier extracted from the differential demodulated signal has a phase near $+(\pi/4)$, $-(\pi/4)$, $+(3\pi/4)$ or $-(3\pi/4)$.

3. The sampling offset estimation apparatus of claim 1, wherein the reference pilot sub-carrier, the reference information sub-carrier, and the reference data sub-carrier all have phases around a predetermined reference phase.

4. The sampling offset estimation apparatus of claim 3, wherein the predetermined reference phase is $\pi/4$.

5. The sampling offset estimation apparatus of claim 1, wherein the pilot sub-carrier refining unit refines a pilot sub-carrier having a phase near 0 or π to generate a reference pilot sub-carrier having a phase near π/4.

6. The sampling offset estimation apparatus of claim 1, wherein the information sub-carrier refining unit comprises:
 a real component multiplexer to output a real component value of the information sub-carrier if a sign of the real component value is positive (+), and to reverse the sign of the real component value and to output the sign reversed value of the real component value if the sign of the real component value is negative (−);
 an imaginary component multiplexer to output an imaginary component value of the information sub-carrier if the sign of the real component value is positive (+), and to reverse a sign of the imaginary component value and to output the sign reversed value of the imaginary component value if the sign of the real component value is negative (−);
 a subtractor to subtract an output value of the imaginary component multiplexer from an output value of the real component multiplexer, and to output the result of the subtraction as a real component value of the reference information sub-carrier; and
 an adder to add the output value of the imaginary component multiplexer to the output value of the real component multiplexer, and to output the result of the addition as an imaginary component value of the reference information sub-carrier.

7. The sampling offset estimation apparatus of claim 6, wherein the information sub-carrier refining unit refines an information sub-carrier having a phase near 0 or π to generate a reference information sub-carrier having a phase near π/4.

8. The sampling offset estimation apparatus of claim 1, wherein the data sub-carrier refining unit comprises:
 a first absolute value calculator to output an absolute value of a real component value of the data sub-carrier, as a first absolute value;
 a second absolute value calculator to output an absolute value of an imaginary component value of the data sub-carrier, as a second absolute value;
 a first multiplexer to output the first absolute value or the second absolute value, as a real component value of the reference data sub-carrier; and
 a second multiplexer to output the second absolute value or the first absolute value, as an imaginary component value of the reference data sub-carrier.

9. The sampling offset estimation apparatus of claim 8, wherein:
 the first multiplexer outputs the first absolute value, as the real component value of the reference data sub-carrier, if a sign of the real component value of the data sub-carrier is the same as a sign of the imaginary component value of the data sub-carrier, and outputs the second absolute value, as the real component value of the reference data sub-carrier, if a sign of the real component value of the data sub-carrier is different from a sign of the imaginary component value of the data sub-carrier, and
 the second multiplexer outputs the second absolute value, as the imaginary component value of the reference data sub-carrier, if the sign of the real component value of the data sub-carrier is the same as the sign of the imaginary component value of the data sub-carrier, and outputs the first absolute value, as the imaginary component value of the reference data sub-carrier, if the sign of the real component value of the data sub-carrier is different from the sign of the imaginary component value of the data sub-carrier.

10. The sampling offset estimation apparatus of claim 9, further comprising:
 a first sign determining unit to determine the sign of the real component value of the data sub-carrier;
 a second sign determining unit to determine the sign of the imaginary component value of the data sub-carrier; and
 an XOR calculator to control an output of the first multiplexer and an output of the second multiplexer, on a basis of an output value of the first sign determining unit and an output value of the second sign determining unit.

11. The sampling offset estimation apparatus of claim 8, further comprising:
 a third multiplexer to output the real component value of the data sub-carrier or a value "0" to the first absolute value calculator;
 a fourth multiplexer to output the imaginary component value of the data sub-carrier or the value "0" to the second absolute value calculator; and
 a clipping controller to control an output of the third multiplexer and an output of the fourth multiplexer on a basis of a magnitude of the data sub-carrier.

12. The sampling offset estimation apparatus of claim 11, wherein the third multiplexer outputs the real component value of the data sub-carrier if the magnitude of the data sub-carrier is within a predetermined valid range, and outputs the value "0" if the magnitude of the data sub-carrier is not within the predetermined valid range, and
 the fourth multiplexer outputs the imaginary component value of the data sub-carrier if the magnitude of the data sub-carrier is within the predetermined valid range, and outputs the value "0" if the magnitude of the data sub-carrier is not within the predetermined valid range.

13. The sampling offset estimation apparatus of claim 8, wherein the data sub-carrier refining unit refines a data sub-carrier having a phase near $+(\pi/4)$, $-(\pi/4)$, $+(3\pi/4)$, or $-(3\pi/4)$ to generate a reference data sub-carrier having a phase near π/4.

14. The sampling offset estimation apparatus of claim 1, wherein the sampling offset estimating unit comprises:
 a first carrier adder to add a plurality of reference pilot sub-carriers having negative (−) carrier indexes, a plurality of reference information sub-carriers having negative (−) carrier indexes, and a plurality of reference data sub-carriers having negative (−) carrier indexes;
 a first phase detector to detect a phase of an output value of the first carrier adder, and to output a first phase detection value;
 a second carrier adder to add a plurality of reference pilot sub-carriers having positive (+) carrier indexes, a plurality of reference information sub-carriers having positive (+) carrier indexes, and a plurality of reference data sub-carriers having positive (+) carrier indexes;
 a second phase detector to detect a phase of an output value of the second carrier adder, and to output a second phase detection value; and
 a subtractor to output a difference between the first phase detection value and the second phase detection value, as indicating information of the sampling offset.

15. The sampling offset estimation apparatus of claim 14, further comprising:
 a loop-filter to perform loop-filtering on the difference between the first phase detection value and the second phase detection value, and to output the result of the loop-filtering as the sampling offset.

16. The sampling offset estimation apparatus of claim 14, further comprising:
- a first pilot carrier accumulator to accumulate the reference pilot sub-carriers having the negative (−) carrier indexes for one or more symbol periods, and to output the result of the accumulation to the first carrier adder;
- a second pilot carrier accumulator to accumulate the reference pilot sub-carriers having the positive (+) carrier indexes for one or more symbol periods, and to output the result of the accumulation to the second carrier adder;
- a first information carrier accumulator to accumulate the reference information sub-carriers having the negative (−) carrier indexes for one or more symbol periods, and to output the result of the accumulation to the first carrier adder;
- a second information carrier accumulator to accumulate the reference information sub-carriers having the positive (+) carrier indexes for one or more symbol periods, and to output the result of the accumulation to the second carrier adder;
- a first data carrier accumulator to accumulate the reference data sub-carriers having the negative (−) carrier indexes for one or more symbol periods, and to output the result of the accumulation to the first carrier adder; and
- a second data carrier accumulator to accumulate the reference data sub-carrier having the positive (+) carrier indexes for one or more symbol periods, and to output the result of the accumulation to the second carrier adder.

17. The sampling offset estimation apparatus of claim 16, further comprising:
- a pilot carrier selector to remove reference pilot sub-carriers belonging to a predetermined removal region from the plurality of reference pilot sub-carriers, and to output the reference pilot sub-carriers other than those belonging to the predetermined removal region, to the first pilot carrier accumulator or the second pilot carrier accumulator;
- an information carrier selector to remove reference information sub-carriers belonging to the predetermined removal region from the plurality of reference information sub-carriers, and to output the reference information sub-carriers other than those belonging to the predetermined removal region, to the first information carrier accumulator or the second information carrier accumulator; and
- a data carrier selector removing reference data sub-carriers belonging to the predetermined removal region from the plurality of reference data sub-carriers, and to output the reference data sub-carriers other than those belonging to the predetermined removal region, to the first data carrier accumulator or the second data carrier accumulator.

18. The sampling offset estimation apparatus of claim 17, wherein reference pilot sub-carriers, reference information sub-carriers, and reference data sub-carriers, with carrier indexes k within the range of −a≦k≦+a, are included in the predetermined removal region, wherein, if a minimum carrier index of k is −K and a maximum carrier index of k is +K, a is a natural number smaller than K.

19. The sampling offset estimation apparatus of claim 18, wherein the pilot carrier selector outputs reference pilot sub-carriers with carrier indexes k within the range of −K≦k≦−(a+1) to the first pilot carrier accumulator, removes reference pilot sub-carriers with carrier indexes k within the range of −a≦k≦+a, and outputs reference pilot sub-carriers with carrier indexes k within the range of (a+1)≦k≦+K to the second pilot carrier accumulator.

20. The sampling offset estimation apparatus of claim 18, wherein the information carrier selector outputs reference information sub-carriers with carrier indexes k within the range of −K≦k≦−(a+1) to the first information carrier accumulator, removes reference information sub-carriers with carrier indexes k within the range of −a≦k≦+a, and outputs reference information sub-carriers with carrier indexes k within the range of (a+1)≦k≦+K to the second information carrier accumulator.

21. The sampling offset estimation apparatus of claim 18, wherein the data carrier selector outputs reference data sub-carriers with carrier indexes k within the range of −K≦k≦−(a+1) to the first data carrier accumulator, removes reference data sub-carriers with carrier indexes k within the range of −a≦k≦+a, and outputs reference data sub-carriers with carrier indexes k within the range of (a+1)≦k≦+K to the second data carrier accumulator.

22. A sampling offset estimation method, comprising:
- refining a pilot sub-carrier extracted from a differential demodulated signal, and generating a reference pilot sub-carrier;
- refining an information sub-carrier extracted from the differential demodulated signal, and generating a reference information sub-carrier;
- refining a data sub-carrier extracted from the differential demodulated signal, and generating a reference data sub-carrier;
- adding a plurality of reference pilot sub-carriers having negative (−) carrier indexes, a plurality of reference information sub-carriers having negative (−) carrier indexes, and a plurality of reference data sub-carriers having negative (−) carrier indexes, detecting a phase of the result of the addition, and outputting a first phase detection value;
- adding a plurality of reference pilot sub-carriers having positive (+) carrier indexes, a plurality of reference information sub-carriers having positive (+) carrier indexes, and a plurality of reference data sub-carriers having positive (+) carrier indexes, detecting a phase of the result of the addition, and outputting a second phase detection value;
- outputting a difference between the first phase detection value and the second phase detection value, as indicating information of the sampling offset,
wherein the pilot sub-carrier is refined by a pilot sub-carrier refining unit, and
the pilot sub-carrier refining unit comprises:
- a real component multiplexer to output a real component value of the pilot sub-carrier if a sign of the real component value is positive (+), and to reverse the sign of the real component value and to output the sign reversed value of the real component value if the sign of the real component value is negative (−);
- an imaginary component multiplexer to output an imaginary component value of the pilot sub-carrier if the sign of the real component value is positive (+), and to reverse the sign of the imaginary component value and to output the sign reversed value of the imaginary component value if the sign of the real component value is negative (−);
- a subtractor to subtract an output value of the imaginary component multiplexer from an output value of the real component multiplexer, and to output the result of the subtraction as a real component value of the reference pilot sub-carrier; and
an adder to add the output value of the imaginary component multiplexer to the output value of the real component multiplexer, and to output the result of the addition as an imaginary component value of the reference pilot sub-carrier.

23. The sampling offset estimation method of claim 22, where the method is applied to estimate a sampling offset included in a differential demodulated signal, in a receiver of an Orthogonal Frequency Division Multiplexing/Differential Quadrature Phase Shift Keying (OFDM/DQPSK) system.

24. The sampling offset estimation method of claim 22, wherein the pilot sub-carrier extracted from the differential demodulated signal has a phase near 0 or π, the information sub-carrier extracted from the differential demodulated signal has a phase near 0 or π, and the data sub-carrier extracted from the differential demodulated signal has a phase near +(π/4), −(π/4), +(3π/4) or −(3π/4).

25. The sampling offset estimation method of claim 22, wherein the reference pilot sub-carrier, the reference information sub-carrier, and the reference data sub-carrier all have phases near π/4.

26. The sampling offset estimation method of claim 22, further comprising:
removing data sub-carriers with magnitudes not within a predetermined valid range, from a plurality of data sub-carriers extracted from the differential demodulated signal.

27. The sampling offset estimation method of claim 22, further comprising:
removing reference pilot sub-carriers, reference information sub-carriers, and data sub-carriers, with carrier indexes k within the range of −a≦k≦+a, wherein, if a minimum carrier index of k is −K and a maximum carrier index of k is +K, a is a natural number smaller than K.

28. The sampling offset estimation method of claim 22, further comprising:
performing loop-filtering on the difference between the first phase detection value and the second phase detection value; and
outputting the result of the loop-filtering as the sampling offset.

29. The sampling offset estimation method of claim 22, wherein:
the plurality of reference pilot sub-carriers having the negative (−) carrier indexes, the plurality of reference information sub-carriers having the negative (−) carrier indexes, and the plurality of reference data sub-carriers having the negative (−) carrier indexes, are respectively accumulated for one or more symbol periods, the results of the accumulation are added, and the phase of the result of the addition is detected, so that the first phase detection value is output; and
the plurality of reference pilot sub-carriers having the positive (+) carrier indexes, the plurality of reference information sub-carriers having the positive (+) carrier indexes, and the plurality of reference data sub-carriers having the positive (+) carrier indexes, are respectively accumulated for one or more symbol periods, the results of the accumulation are added, and the phase of the result of the addition is detected, so that the second phase detection value is output.

30. A sampling offset estimation apparatus, comprising:
a receiving unit to receive a differential demodulated signal; and
a sampling offset estimating unit to estimate a sampling offset included in the differential demodulated signal based on a reference pilot sub-carrier, a reference information sub-carrier, and a reference data sub-carrier,
wherein the reference pilot sub-carrier, the reference information sub-carrier, and the reference data sub-carrier are based on a pilot sub-carrier, an information sub-carrier, and a data sub-carrier in the differential demodulated signal,
the reference pilot sub-carrier is generated by refining the pilot sub-carrier in a pilot sub-carrier refining unit, and
the pilot sub-carrier refining unit comprises:
a real component multiplexer to output a real component value of the pilot sub-carrier if a sign of the real component value is positive (+), and to reverse the sign of the real component value and to output the sign reversed value of the real component value if the sign of the real component value is negative (−);
an imaginary component multiplexer to output an imaginary component value of the pilot sub-carrier if the sign of the real component value is positive (+), and to reverse the sign of the imaginary component value and to output the sign reversed value of the imaginary component value if the sign of the real component value is negative (−);
a subtractor to subtract an output value of the imaginary component multiplexer from an output value of the real component multiplexer, and to output the result of the subtraction as a real component value of the reference pilot sub-carrier; and
an adder to add the output value of the imaginary component multiplexer to the output value of the real component multiplexer, and to output the result of the addition as an imaginary component value of the reference pilot sub-carrier.

31. A sampling offset estimation apparatus, comprising:
an identifying unit to identify a plurality of sub-carriers within a predetermined range in a differential demodulated signal;
a plurality of sub-carrier refining units to generate reference sub-carriers based on the identified plurality of sub-carriers; and
a sampling offset estimating unit to estimate a sampling offset based on the generated reference sub-carriers,
wherein one of the plurality of sub-carrier refining units is a pilot sub-carrier refining unit to refine a pilot sub-carrier to generate a reference pilot sub-carrier, and
the pilot sub-carrier refining unit comprises:
a real component multiplexer to output a real component value of the pilot sub-carrier if a sign of the real component value is positive (+), and to reverse the sign of the real component value and to output the sign reversed value of the real component value if the sign of the real component value is negative (−);
an imaginary component multiplexer to output an imaginary component value of the pilot sub-carrier if the sign of the real component value is positive (+), and to reverse the sign of the imaginary component value and to output the sign reversed value of the imaginary component value if the sign of the real component value is negative (−);
a subtractor to subtract an output value of the imaginary component multiplexer from an output value of the real component multiplexer, and to output the result of the subtraction as a real component value of the reference pilot sub-carrier; and an adder to add the output value of the imaginary component multiplexer to the output value of the real component multiplexer, and to output the result of the addition as an imaginary component value of the reference pilot sub-carrier.

32. The apparatus of claim 31, wherein the pilot sub-carrier refining unit refines the pilot sub-carrier extracted from a differential demodulated signal, and the plurality of sub-carrier refining units further comprise:

an information sub-carrier refining unit to refine an information sub-carrier extracted from the differential demodulated signal, and to generate a reference information sub-carrier; and a data sub-carrier refining unit to refine a data sub-carrier extracted from the differential demodulated signal, and to generate a reference data sub-carrier.

33. A method of estimating a sampling offset of a communication apparatus, the method comprising:

receiving a differential demodulated signal; and estimating a sampling offset included in the differential demodulated signal based on a reference pilot sub-carrier, a reference information sub-carrier, and a reference data sub-carrier, wherein the reference pilot sub-carrier, the reference information sub-carrier, and the reference data sub-carrier are based on a pilot sub-carrier, an information sub-carrier, and a data sub-carrier in the differential demodulated signal, the reference pilot sub-carrier is generated by refining the pilot sub-carrier with a pilot sub-carrier refining unit, and the pilot sub-carrier refining unit comprises:

a real component multiplexer to output a real component value of the pilot sub-carrier if a sign of the real component value is positive (+), and to reverse the sign of the real component value and to output the sign reversed value of the real component value if the sign of the real component value is negative (−);

an imaginary component multiplexer to output an imaginary component value of the pilot sub-carrier if the sign of the real component value is positive (+), and to reverse the sign of the imaginary component value and to output the sign reversed value of the imaginary component value if the sign of the real component value is negative (−);

a subtractor to subtract an output value of the imaginary component multiplexer from an output value of the real component multiplexer, and to output the result of the subtraction as a real component value of the reference pilot sub-carrier; and an adder to add the output value of the imaginary component multiplexer to the output value of the real component multiplexer, and to output the result of the addition as an imaginary component value of the reference pilot sub-carrier.

34. A method of estimating a sampling offset of a communication apparatus, the method comprising:

identifying a plurality of sub-carriers within a predetermined range in a differential demodulated signal;

generating reference sub-carriers based on the identified plurality of sub-carriers; and estimating a sampling offset based on the generated reference sub-carriers, wherein the plurality of reference sub-carriers includes a reference pilot sub-carrier generated by refining a pilot sub-carrier with a pilot sub-carrier refining unit, and the pilot sub-carrier refining unit comprises:

a real component multiplexer to output a real component value of the pilot sub-carrier if a sign of the real component value is positive (+), and to reverse the sign of the real component value and to output the sign reversed value of the real component value if the sign of the real component value is negative (−);

an imaginary component multiplexer to output an imaginary component value of the pilot sub-carrier if the sign of the real component value is positive (+), and to reverse the sign of the imaginary component value and to output the sign reversed value of the imaginary component value if the sign of the real component value is negative (−);

a subtractor to subtract an output value of the imaginary component multiplexer from an output value of the real component multiplexer, and to output the result of the subtraction as a real component value of the reference pilot sub-carrier; and an adder to add the output value of the imaginary component multiplexer to the output value of the real component multiplexer, and to output the result of the addition as an imaginary component value of the reference pilot sub-carrier.

35. A non-transitory computer-readable recording medium having embodied thereon a computer program to execute a method, wherein the method comprises:

receiving a differential demodulated signal; and estimating a sampling offset included in the differential demodulated signal based on a reference pilot sub-carrier, a reference information sub-carrier, and a reference data sub-carrier, wherein the reference pilot sub-carrier, the reference information sub-carrier, and the reference data sub-carrier are based on a pilot sub-carrier, an information sub-carrier, and a data sub-carrier in the differential demodulated signal, the reference pilot sub-carrier is generated by refining the pilot sub-carrier with a pilot sub-carrier refining unit, and the pilot sub-carrier refining unit comprises:

a real component multiplexer to output a real component value of the pilot sub-carrier if a sign of the real component value is positive (+), and to reverse the sign of the real component value and to output the sign reversed value of the real component value if the sign of the real component value is negative (−);

an imaginary component multiplexer to output an imaginary component value of the pilot sub-carrier if the sign of the real component value is positive (+), and to reverse the sign of the imaginary component value and to output the sign reversed value of the imaginary component value if the sign of the real component value is negative (−);

a subtractor to subtract an output value of the imaginary component multiplexer from an output value of the real component multiplexer, and to output the result of the subtraction as a real component value of the reference pilot sub-carrier; and an adder to add the output value of the imaginary component multiplexer to the output value of the real component multiplexer, and to output the result of the addition as an imaginary component value of the reference pilot sub-carrier.

* * * * *